US010469318B1

(12) United States Patent
Parthasarathy et al.

(10) Patent No.: US 10,469,318 B1
(45) Date of Patent: Nov. 5, 2019

(54) STATE TRACKING IN DISTRIBUTED COMPUTING SYSTEMS

(71) Applicant: Nutanix, Inc., San Jose, CA (US)

(72) Inventors: Ranjan Parthasarathy, Milpitas, CA (US); Abhijit S. Khinvasara, Los Altos, CA (US); Bharath Yarlagadda, San Jose, CA (US); Vinod Gupta, Fremont, CA (US)

(73) Assignee: NUTANIX, INC., San Jose, CA (US)

( * ) Notice: Subject to any disclaimer, the term of this patent is extended or adjusted under 35 U.S.C. 154(b) by 139 days.

(21) Appl. No.: 15/388,995

(22) Filed: Dec. 22, 2016

(51) Int. Cl.
G06F 15/16 (2006.01)
H04L 12/24 (2006.01)
H04L 12/927 (2013.01)
H04L 12/925 (2013.01)
H04L 29/08 (2006.01)

(52) U.S. Cl.
CPC ........ *H04L 41/0859* (2013.01); *H04L 47/722* (2013.01); *H04L 47/803* (2013.01); *H04L 67/10* (2013.01)

(58) Field of Classification Search
CPC .................................................. H04L 41/0859
USPC .......................................................... 709/226
See application file for complete search history.

(56) References Cited

U.S. PATENT DOCUMENTS

| 6,052,722 | A | 4/2000 | Taghadoss |
| 6,327,550 | B1 | 12/2001 | Vinberg et al. |
| 6,457,135 | B1 | 9/2002 | Cooper |
| 6,460,071 | B1 | 10/2002 | Hoffman |
| 6,636,963 | B1 | 10/2003 | Stein et al. |
| 6,848,106 | B1 | 1/2005 | Hipp |
| 7,103,874 | B2 | 9/2006 | Mccollum et al. |
| 7,203,868 | B1 | 4/2007 | Evoy |
| 7,844,853 | B2 * | 11/2010 | Barsness ............. G06F 11/1438 714/19 |
| 8,140,624 | B2 | 3/2012 | Gingell et al. |
| 8,364,639 | B1 | 1/2013 | Koryakina et al. |
| 8,549,518 | B1 | 10/2013 | Aron et al. |
| 8,589,574 | B1 | 11/2013 | Connie et al. |
| 8,595,331 | B2 | 11/2013 | Henseler et al. |

(Continued)

OTHER PUBLICATIONS

"Use Time Machine to back up or restore your Mac". Apple. Dec. 10, 2016. 4 pages.
Non-Final Office Action dated Oct. 19, 2018 for related U.S. Appl. No. 15/389,123, 20 pages.

(Continued)

*Primary Examiner* — Hamza N Algibhah
(74) *Attorney, Agent, or Firm* — Vista IP Law Group, LLP

(57) ABSTRACT

Systems and methods commence upon detecting certain computing system specification change events. Changes are recorded in resource usage intent specification records that characterize desired states associated with respective resources of the computing system. The change event causes generation of a data state snapshot of data stored in the computing system. A state tuple is constructed to associate the desired state with the data state. The state tuple is committed to a version control system. At any time, a user or process can select a selected system state tuple from committed tuples stored in the version control system. The tuple is analyzed to determine its associated desired state and its data state. Actions are taken to restore the data state of the tuple to the computing system, and then bringing the computing system to the state of the tuple so as to reproduce the desired system state in the computing system.

20 Claims, 15 Drawing Sheets

(56) References Cited

U.S. PATENT DOCUMENTS

| | | | |
|---|---|---|---|
| 8,601,473 B1 | 12/2013 | Aron et al. | |
| 8,726,083 B1 * | 5/2014 | van der Goot | G06F 11/1438 714/15 |
| 8,850,130 B1 | 9/2014 | Aron et al. | |
| 8,997,097 B1 | 3/2015 | Aron et al. | |
| 9,052,936 B1 | 6/2015 | Aron et al. | |
| 9,208,056 B1 * | 12/2015 | Henriksen | G06F 11/3604 |
| 9,256,374 B1 | 2/2016 | Aron et al. | |
| 9,256,475 B1 | 2/2016 | Aron et al. | |
| 9,354,912 B1 | 5/2016 | Aron et al. | |
| 9,389,887 B1 | 7/2016 | Aron et al. | |
| 9,575,784 B1 | 2/2017 | Aron et al. | |
| 9,619,257 B1 | 4/2017 | Aron et al. | |
| 9,804,901 B2 | 10/2017 | Gambardella et al. | |
| 2010/0180092 A1 * | 7/2010 | Rajaa | G06F 17/30067 711/162 |
| 2014/0149696 A1 * | 5/2014 | Frenkel | G06F 12/16 711/162 |
| 2014/0279903 A1 * | 9/2014 | Hsiao | G06F 17/30377 707/638 |
| 2014/0365884 A1 | 12/2014 | Kara et al. | |
| 2015/0373096 A1 * | 12/2015 | Chandrasekaran | H04W 4/023 709/226 |
| 2016/0150047 A1 * | 5/2016 | O'Hare | G06F 3/0619 713/168 |
| 2016/0179629 A1 * | 6/2016 | Gupta | G06F 17/30876 707/649 |
| 2017/0177738 A1 * | 6/2017 | Goldman | G06F 17/30705 |
| 2017/0227377 A1 | 8/2017 | Navarro et al. | |
| 2017/0317887 A1 | 11/2017 | Dwaraki et al. | |
| 2017/0329404 A1 * | 11/2017 | Keskin | G06F 3/015 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Notice of Allowance dated May 3, 2019 for related U.S. Appl. No. 15/389,123, 10 pages.

* cited by examiner

STATE TRACKING IN DISTRIBUTED COMPUTING SYSTEMS

RELATED APPLICATIONS

The present application is related to co-pending U.S. patent application Ser. No. 15/389,123 titled, "STATE CONTROL IN DISTRIBUTED COMPUTING SYSTEMS", filed on even date herewith, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

This disclosure relates to distributed computing system management, and more particularly to techniques for computing cluster state management in distributed computing systems.

BACKGROUND

Modern distributed computing systems have evolved to natively coordinate distributed compute, storage, networking, and/or other distributed resources in such a way that incremental scaling can be accomplished in many dimensions. For example, some clusters in a distributed computing system might deploy hundreds of nodes or more that support several thousands or more autonomous virtualized entities (e.g., VMs, containers, etc.) that are individually tasked to perform one or more of a broad range of computing workloads. In many cases, several thousand VEs might be launched (e.g., in a swarm) to perform some set of tasks, then finish and collate their results, then self-terminate. As such, the working data, configuration (e.g., topology, resource distribution, etc.), and/or other characteristics of the distributed system can be highly dynamic.

Some system configuration changes in such large scale, highly dynamic distributed computing systems are a result of resource scheduling operations executed by the system. For example, the system might migrate a certain VM from one node to another node to balance the resource usage in a cluster. Further, system administrators of such distributed computing systems will often interact with the system to specify their "intent" pertaining to the resource usage in the system. For example, a system administrator might specify an intent to instantiate 30 VMs for running a virtual desktop infrastructure (VDI) workload and 20 VMs for running an SQL server workload. The distributed system can then deploy that intent in such a way that the system resources are most efficiently utilized. In some cases, multiple system administrators (e.g., from various departments in an enterprise) might interact with the system to specify resource usage intents for various respective purposes. In these cases, the change rate of the distributed system is further increased.

As the state of the distributed computing system changes over time, the system administrator might desire access to information pertaining to the then-current state and/or previous states of the distributed system to facilitate certain actions, such as a reversion action (e.g., roll back action or roll forward action) to some selected state.

Unfortunately, legacy techniques for capturing restorable states of entire computing clusters are nonexistent or deficient. For example, some procedural tracking techniques merely record the steps and/or operations executed over time that effect the state of the system. However, such techniques fail to consider the interdependencies of steps and/or operations invoked by multiple sources. Further, these techniques fail to capture and process non-procedural aspects of the system.

Moreover, legacy techniques for controlling (e.g., restoring) the state of the resources in a computing system are nonexistent or deficient. Specifically, the aforementioned procedural techniques merely facilitate rerunning start-up scripts and or replay or reversal of the captured steps and/or operations to reach a desired state (e.g., earlier state). However, due in part to the earlier described limitations pertaining to interdependencies and/or non-procedural aspects of the state, a mere replay or reversal of steps and/or operations may result in a state that is different from the desired state. Additional manual work (e.g., working data recovery, etc.) by the system administrator may be needed to bring the state obtained by procedural techniques nearer to the desired state. What is needed is a technological solution for efficiently tracking and controlling the state of the resources in a computing system.

What is needed is a technique or techniques to improve over legacy techniques and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for state management in hyperconverged distributed computing systems, which techniques advance the relevant technologies to address technological issues with legacy approaches. More specifically, the present disclosure provides a detailed description of techniques used in systems, methods, and in computer program products for managing the states of highly dynamic hyperconverged distributed computing systems. Certain embodiments are directed to technological solutions for committing a set of resource usage intent specifications and an associated stored data snapshot at certain moments in time to a version control system to facilitate state tracking and/or control (e.g., reversion) in highly-dynamic distributed computing systems.

The disclosed embodiments modify and improve over legacy approaches. In particular, the herein-disclosed techniques provide technical solutions that address the technical problems attendant to efficiently tracking and controlling the state of the resources in a highly dynamic multi-user hyperconverged distributed computing system. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of computing cluster management.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
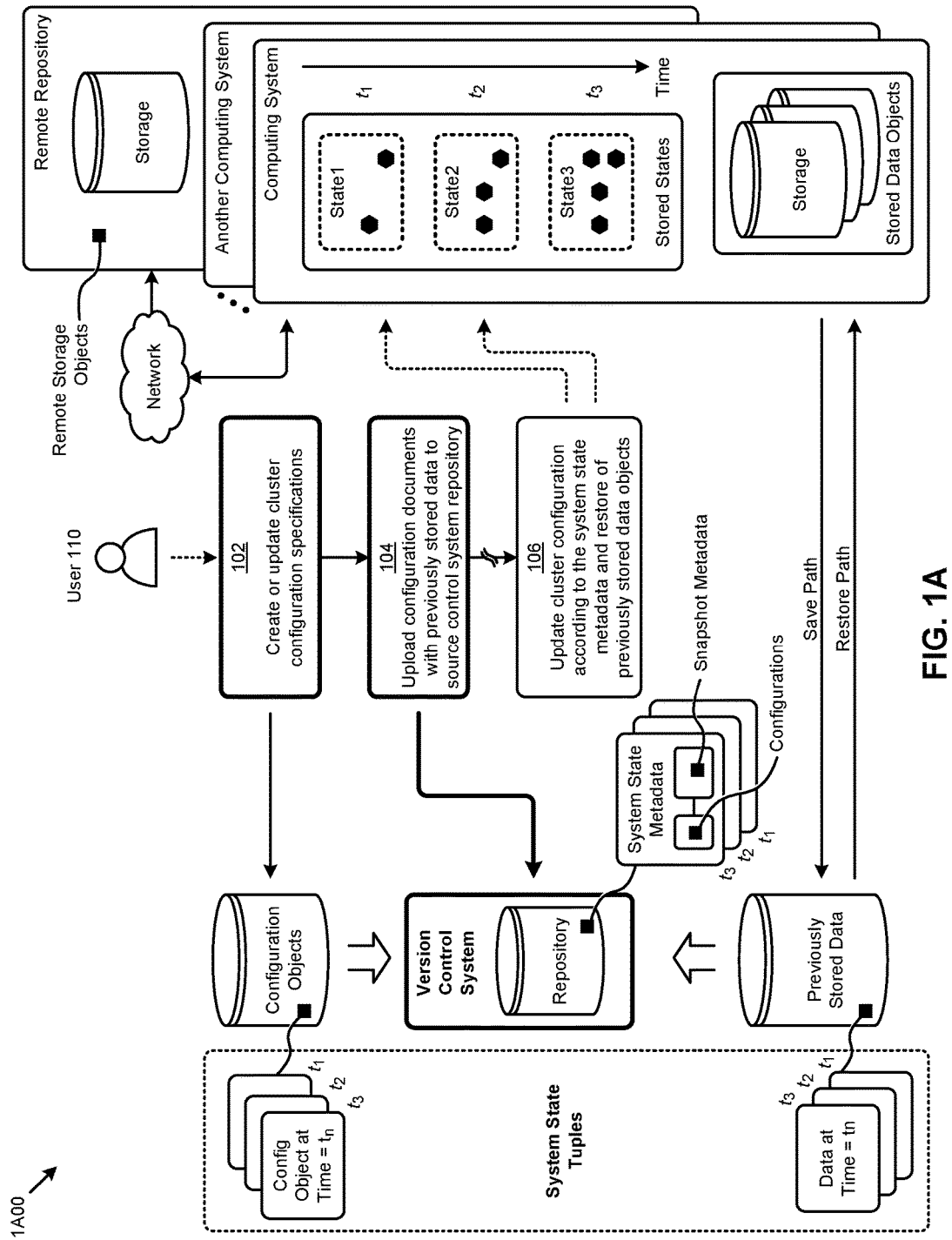
FIG. 1A illustrates a cluster state tracking technique, according to an embodiment.

Embodiments in accordance with the present disclosure address the problem of efficiently tracking and controlling the state of the resources in a highly dynamic multi-user distributed computing system. Some embodiments are directed to approaches for committing a set of resource usage intent specifications and an associated stored data snapshot at certain moments in time to a version control system (VCS) to facilitate state tracking and/or control (e.g., reversion) in distributed computing systems. The accompanying figures and discussions herein present example environments, systems, methods, and computer program products for managing the states of highly dynamic distributed computing systems.

Overview

Disclosed herein are techniques for committing a set of resource usage intent specifications and an associated data snapshot at certain moments in time to a source code control system (SCCS) or other type of version control system to facilitate system state tracking in a distributed computing system. In certain embodiments, a then-current set of resource usage intent specifications is captured in response to a change to the specification or another event. Just prior to applying the intent specification to the distributed system, the data snapshot is generated. The then-current resource usage intent specifications and associated data snapshot are committed to a VCS (e.g., SCCS) repository as system state having a corresponding unique state identifier. Additional resource usage intent specification and data snapshot tuples are committed as system states to the VCS repository over time. In certain embodiments, a user can interact with the repository at a management interface or at a console. In some embodiments, the resource usage intent specifications comprise various specification attributes. In other embodiments, some or all of the distributed system can be quiesced prior to generating the stored data snapshot.

Also disclosed herein are techniques for controlling the state of the distributed computing system by reverting to a system state selected from the VCS repository. In certain embodiments, the selected system state is identified from a list of system states stored in the VCS repository. The VCS repository is accessed to retrieve the resource usage intent specifications and data snapshot associated with the selected system state. The data snapshot is restored at the system and the resource usage intent specifications are applied at the system to achieve the selected system state. In certain embodiments, a user can interact with the VCS repository at a management interface or at a version control system console. In some embodiments, merely a portion of the resource usage intent specifications and/or a portion of the data snapshot can be applied to the system to achieve the selected system state. In other embodiments, the selected system state can be created at a moment in time earlier or later than the moment of time at which an earlier selected system state was created. A unique system state can be created and captured at any point in time when data objects are saved (e.g., in a snapshotting or other data backup operation) and/or whenever any object of any variety in the system is written to (e.g., changing content data) or otherwise updated (e.g., changing a file name, etc.).

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A illustrates a cluster state tracking technique 1A00. As an option, one or more variations of cluster state tracking technique 1A00 or any aspect thereof may be implemented in the context of the architecture and functionality of the embodiments described herein. The cluster state tracking technique 1A00 or any aspect thereof may be implemented in any environment.

The embodiment shown in FIG. 1A is merely one example implementation of the herein disclosed techniques to track the various states of a computing cluster. Specifically, a representative set of states (e.g., State1, State2, and State3) of a computing cluster is shown as stored states in FIG. 1A. The computing cluster is a collection of interoperating computing resources (e.g., computing nodes, networking facilities) and storage resources (e.g., storage devices, storage pools, etc.).

As can be observed, each of the states are associated with a respective moment in time (e.g., $t_1$, $t_2$, and $t_3$, respectively). The state of the cluster or system (e.g., system state) corresponds to a set of conditions pertaining to the resources, and/or entities consuming the resources, associated with the cluster or system. In some cases, the conditions might describe various specification attributes of the resources and/or entities, such as quantity, size, location, speed, and/or other attributes. For example, certain conditions of a particular state might indicate the cluster comprises 20 VMs having four virtual CPUs and 4,024 MB of memory. In other cases, the conditions might describe a then-current set of data that is stored in the system. For example, a set of stored data and metadata might be associated with a particular state.

In certain embodiments, the foregoing entity conditions can correspond to a set of cluster configuration intent specifications (e.g., "intent spec") managed by one or more users (e.g., user 110). Referring the aforementioned example, user 110 might create and/or update an instance of an intent specification that indicates an "intent" to implement 20 VMs having four virtual CPUs and 4,024 MB of memory in the computing cluster. Such instances of intent specs associated with the cluster states can be stored in a configuration objects datastore as shown. As further shown, data snapshots of the stored or working data associated with the cluster states can be stored in a snapshot objects datastore. In many cases, merely a set of metadata (e.g., describing a set of virtual disks) pointing to the then-current physical data blocks of the cluster data will comprise the data snapshot stored in the snapshot objects.

According to the herein disclosed techniques, tracking of a given state of the computing cluster can commence when the cluster configuration intent specifications are created or updated (step 102). The then-current intent specification from the configuration objects and the then-current data snapshot from the snapshot objects can be loaded (e.g., uploaded) to a repository of a source control system (step 104). In some cases all or portions of previously stored data (e.g., snapshot data) as well as intent specifications, as well as any forms of metadata (e.g., snapshot metadata) can be stored in the source control system repository. In other cases any combinations of the snapshot data itself, the intent specifications, and snapshot metadata can be stored in any location accessible to the cluster and/or to the source control system. In one case, the snapshot data itself is stored on a cluster in a cluster-wide storage pool. In another case, the snapshot data itself, the intent specifications, and snapshot metadata is stored in one or more remote repositories that are accessible to the cluster over a network (e.g., to a cloud-based repository).

Under instructions by an operational component of a computing cluster, a source control system, also referred to herein as a source code control system (SCCS) or a version control system (VCS), records changes to an object (e.g., file, document, data table, etc.) or set of objects over time to facilitate recalling specific versions of the object or objects. In the cluster state tracking technique 1A00, for example, the source control system repository stores instances (e.g., versions) of system state metadata corresponding to certain moments in time that describe respective instances of intent specification objects and data snapshot objects. Specifically, a set of system state metadata corresponding to time $t_3$ describes an associated intent specification and data snapshot also corresponding to time $t_3$. When the system state tuple (e.g., the system state metadata, as shown) is recorded at the source control system, the cluster configuration is updated according to the newly created and/or updated intent specifications (step 106). In some cases, the aforementioned certain moments in time can be as time-wise granular as any time an object of any sort is subjected to a write operation or other data- or metadata-modifying operation.

The cluster state tracking technique 1A00 tracks the status of the computing cluster by capturing its state at discrete moments in time. Other status tracking techniques are possible, as shown and described as pertaining to FIG. 1B.

Figure 1B:
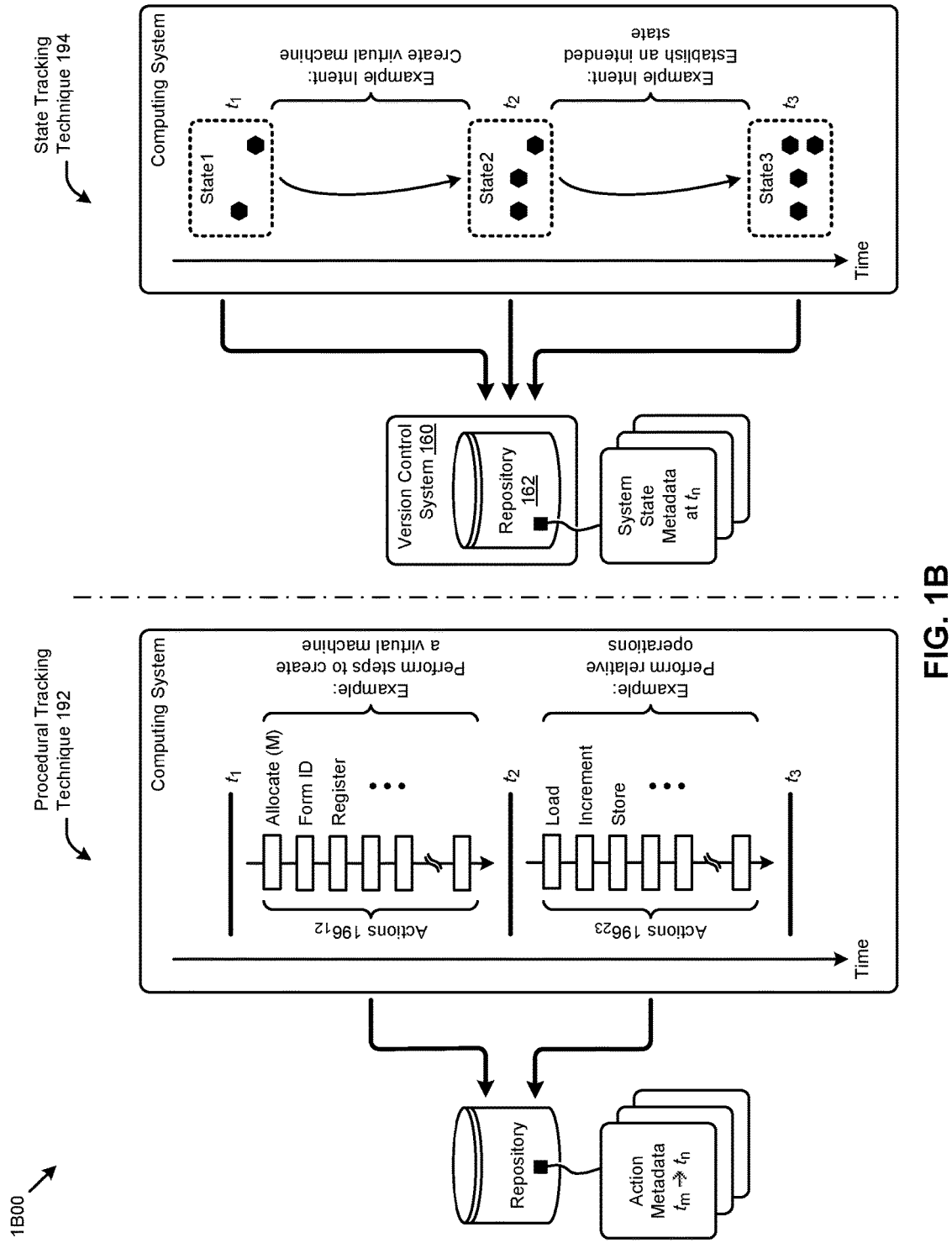
FIG. 1B depicts examples of computing system status tracking techniques, according to an embodiment.

FIG. 1B depicts examples of computing system status tracking techniques 1B00. As an option, one or more variations of computing system status tracking techniques 1B00 or any aspect thereof may be implemented in the context of the architecture and functionality of the embodiments described herein. The computing system status tracking techniques 1B00 or any aspect thereof may be implemented in any environment.

Two example techniques for tracking the status of a computing system are depicted in FIG. 1B. Specifically, a procedural tracking technique 192 and a state tracking technique are shown. As can be observed, the procedural tracking technique 192 addresses capture of the status of the computing system by recording the set of actions taken that change a status between one moment in time and another moment in time. Specifically, as illustrated, a set of actions $196_{12}$ might be executed to transition from $t_1$ to $t_2$, and a set of actions $196_{23}$ might be executed to transition from $t_2$ to $t_3$. Such actions might comprise a set of procedural operations (e.g., allocate memory, form a name or ID for the to-be-created VM, register the name or ID, etc.) that correspond to creation of a VM, starting a container application, installing a new node, and/or other actions. In some cases, procedural operations are relative operations (e.g., the shown "Increment" operation), which procedural operations depend on the occurrence and completeness of a prior state. In some cases techniques that rely on occurrence and completeness of micro-states fail or are non-deterministic. More specifically, in accordance with procedural tracking technique 192, various instances of action metadata describing the actions executed between one moment in time (e.g., $t_m$) and another moment in time (e.g., $t_n$) are stored in a repository. The instances of action metadata can be recalled from the repository to revert to system conditions corresponding to a moment in time associated with a given set of action metadata. In some cases, the procedural tracking technique 192 might fail to consider the interdependencies of steps and/or operations invoked by multiple sources (e.g., multiple system administrators). Further, procedural tracking technique 192 might fail to capture and process non-procedural aspects that affect the conditions of the computing system, such as changes to the stored data. Also, procedural tracking technique 192 merely facilitates reversal or re-execution of the captured actions to reach the desired system conditions. However, due in part to the earlier described limitations pertaining to interdependencies and/or non-procedural aspects of the conditions, such a reversal of actions may result in a set of conditions that is different from the desired set of conditions. Additional manual work (e.g., working data recovery, etc.) by the system administrator may be needed to bring the conditions obtained by procedural tracking technique 192 nearer to the desired conditions.

In comparison, the state tracking technique 194 captures a macro-status of the computing system by recording the conditions or state of the computing system at particular moments in time. Specifically, as illustrated, various instances of system state metadata describing the states (e.g., State1, State2, and State3) of the computing system at respective moments in time (e.g., $t_1$, $t_2$, and $t_3$) are stored in a repository. The instances of state metadata can be recalled from the repository to revert to any of the corresponding system states based on an intended result state. In such cases, reverting to a selected state or set of system conditions based on an intended result state is agnostic to any actions, steps, or operations executed to achieve the selected/intended result state. Further, since a given instance of system state metadata can reference a deterministic fixed set of objects (e.g., files, documents, etc.), the system state metadata can be managed (e.g., stored, recalled, etc.) as "versions" at a version control system 160 having an associated repository (e.g., repository 162).

In certain embodiments, the herein disclosed techniques implement such version control systems. A VCS often comprises a central repository and techniques for managing versions among multiple collaborators. Further, a modern VCS can provide an application programming interface (API) with "hooks" for executing custom operations (e.g., scripts) to facilitate interaction with the VCS and associated repository. Various third-party version control systems (e.g., source control systems, source code control systems, source code repositories, etc.) can be implemented for use by the herein disclosed techniques. In certain embodiments, a "Git" VCS is implemented.

Figure 1C:
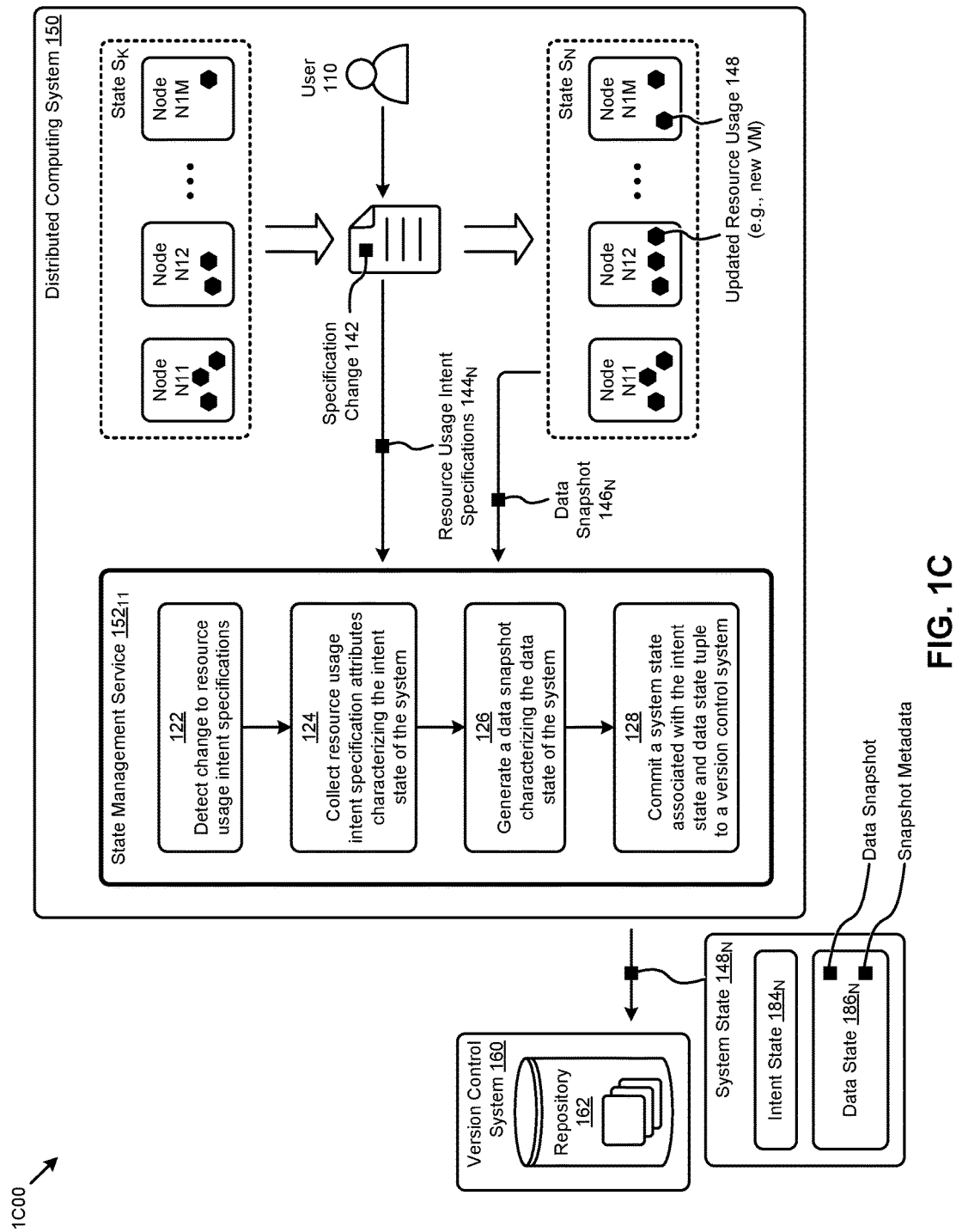
FIG. 1C presents a distributed system state tracking technique as implemented in systems for managing the states of highly dynamic distributed computing systems, according to an embodiment.

Further details describing a state tracking technique implemented according to the herein disclosed techniques is shown and described as pertaining to FIG. 1C.

FIG. 1C presents a distributed system state tracking technique 1C00 as implemented in systems for managing the states of highly dynamic distributed computing systems. As an option, one or more variations of distributed system state tracking technique 1C00 or any aspect thereof may be implemented in the context of the architecture and functionality of the embodiments described herein. The distributed system state tracking technique 1C00 or any aspect thereof may be implemented in any environment.

The embodiment shown in FIG. 1C depicts a state management service $152_{11}$ implemented in a distributed computing system 150 to track the states of the system according to the herein disclosed techniques. The distributed system state tracking technique 1C00 facilitated by state management service $152_{11}$ is illustrated by a transition from a state $S_K$ to a state $S_N$. As can be observed, state $S_K$ is characterized by certain resources and/or entities implemented in a set of representative nodes (e.g., node N11, node N12, . . . , and node N1M) in the distributed computing system 150. A cluster specification change (e.g., specification change 142) implemented by a user (e.g., user 110) affects the aforementioned resources and/or entities so as to result in new set of system conditions characterized by the state $S_N$. For example, user 110 might perform the specification change 142 so as to generate a new set of resource usage intent specifications $144_N$ (e.g., intent specs) corresponding to state $S_N$. Specifically, the specification change 142 might introduce an updated resource usage 148 (e.g., new VM) to distributed computing system 150. The resource usage intent specifications comprise data records that describe various specification attributes associated with an intended use of certain resources in a given resource subsystem (e.g., a cluster in distributed computing system 150). The resource usage intent specifications are often organized, transmitted, and/or stored in key-value pairs, where the key is the specification or attribute type and the value is the set of information associated with that attribute. For example, an attribute associated with a VM memory size key might have a key of "mem" and a value of "4024" (e.g., in MB).

Referring again to FIG. 1C, the distributed system state tracking technique 1C00 as facilitated by state management service $152_{11}$ according to the herein disclosed techniques can commence with detecting the specification change 142 resulting in one or more updates to the resource usage intent specifications (step 122). The then-current resource usage intent specifications that characterize the then-current intent state of distributed computing system 150, are collected (step 124). In some cases, the resource usage intent specifications are collected merely pertain to resources and/or entities affected by the specification change 142 (e.g., updated resource usage 148). A data snapshot $146_N$ characterizing the then-current data state of distributed computing system 150 is also generated (step 126). In some cases, data snapshot $146_N$ merely records changed data (e.g., deltas) from a previous snapshot. In other cases, data snapshot $146_N$ might bounded by a certain set of resources (e.g., within the node or nodes affected by the specification change 142).

As used herein, an intent state refers to a computing system state that is deemed to exist when the declarative specifications of a corresponding command has been met. For example, a declarative specification for creation of a virtual machine might be specified as "create a virtual machine having four virtual CPUs and 4,024 MB of memory on Node#552 of the computing system". When the specified virtual machine has been successfully created to the given specifications, then the intent state corresponding to that declarative exists. A computing system may have many individual constituent intent states, which, when combined are representative of the computing system intent state as a whole.

Continuing the discussion of FIG. 1C, an instance of a system state $148_N$ comprising the intent state (e.g., intent state $184_N$) characterized by the resource usage intent specifications and the data state (e.g., data state $186_N$) characterized by a data snapshot and/or snapshot metadata is then committed to a repository 162 of a version control system 160 (step 128). In some cases, repository 162 is a centralized repository such that a publishing operation is also executed to facilitate collaboration among multiple users. Various instances of system states committed (and published) to repository 162 can then be recalled for various purposes, as shown and described in the technique pertaining to FIG. 1D.

Figure 1D:
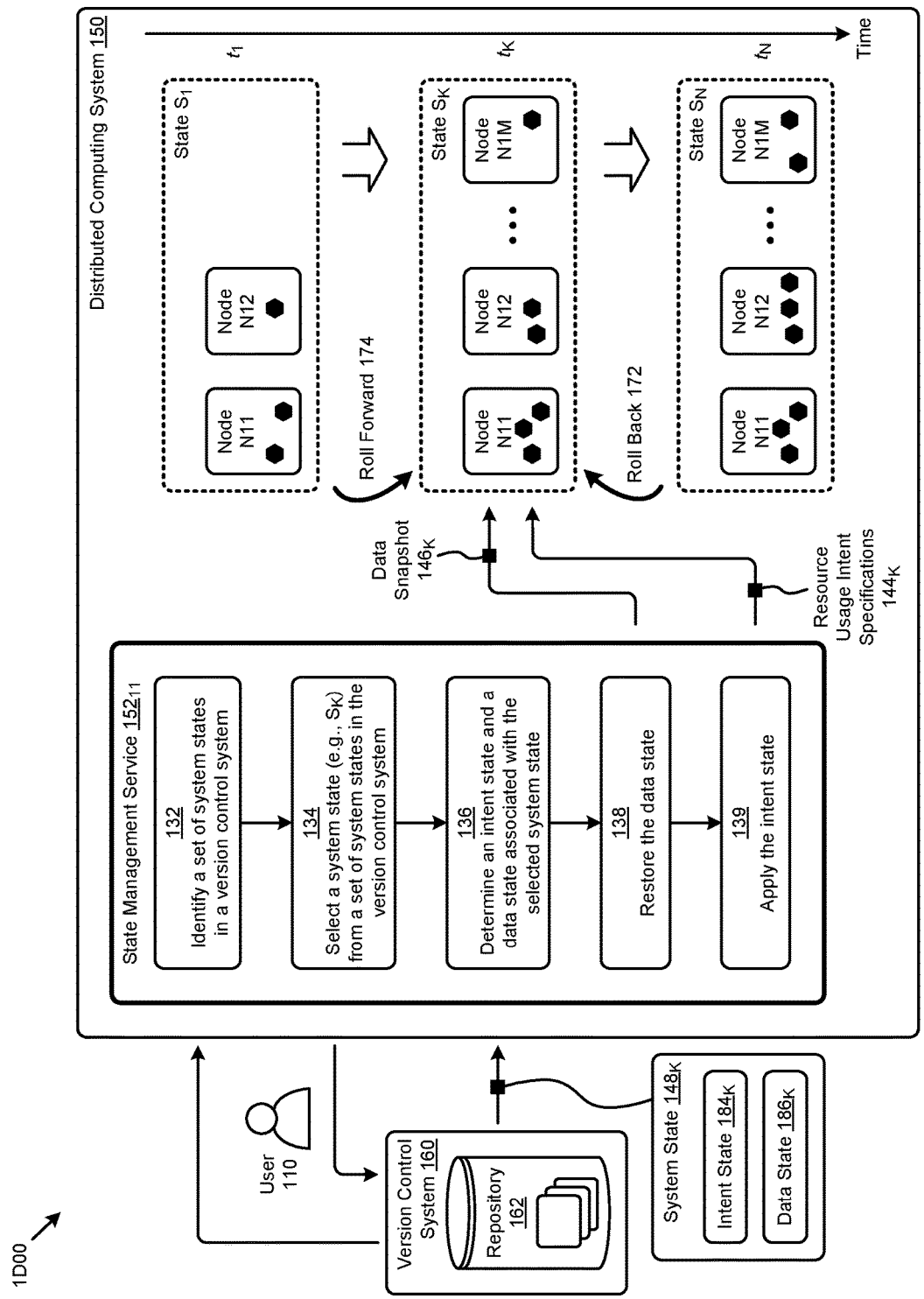
FIG. 1D presents a state control technique as implemented in systems for managing the states of highly dynamic distributed computing systems, according to an embodiment.

FIG. 1D presents a state control technique 1D00 as implemented in systems for managing the states of highly dynamic distributed computing systems. As an option, one or more variations of state control technique 1D00 or any aspect thereof may be implemented in the context of the architecture and functionality of the embodiments described herein. The state control technique 1D00 or any aspect thereof may be implemented in any environment.

The embodiment shown in FIG. 1D depicts the state management service $152_{11}$ implemented in the distributed computing system 150 to control the state of the system according to the herein disclosed techniques. The state control technique 1D00 facilitated by state management service $152_{11}$ is illustrated by a reversion to state $S_K$ from any other system state (e.g., state $S_1, \ldots,$ state $S_N$). As can be observed, the shown states are characterized by certain resources and/or entities implemented in a set of representative nodes (e.g., node N11, node N12, . . . , and node N1M) in the distributed computing system 150. As earlier shown and described in the distributed system state tracking technique 1C00 presented in FIG. 1C, each of the states can be recorded in repository 162 of the version control system 160 according to the herein disclosed techniques. The distributed system state tracking technique 1C00 can enumerate the system states in the version control system 160 (step 132) to facilitate selection of a certain system state to implement in the distributed computing system 150 (step 134). For example, user 110 might select state $S_K$ from the list of available system states captured at the version control system 160. The repository 162 at the version control system 160 is accessed to determine the intent state (e.g., intent state $184_K$) and the data state (e.g., data state $186_K$) associated with the committed system state (e.g., system state $148_K$) corresponding to the selected state $S_K$ (step 136).

The data state associated with the selected state $S_K$ is then restored (step 138). For example, a data snapshot $146_K$ characterizing the data state can be restored to the system. The intent state associated with the selected state $S_K$ is applied to the distributed computing system 150 (step 139). For example, a set of resource usage intent specifications characterizing the intent state can be applied to the system. In certain embodiments, restoring the data state (e.g., data snapshot $146_K$) and deploying the intent state (e.g., resource usage intent specifications $144_K$) is sufficient in achieving the selected state (e.g., state $S_K$). In some situations the intent state associated with the selected state $S_K$ is applied (step 139) to the distributed computing system before restoring the data state (step 138).

The reversion actions to achieve a selected system state is shown as a roll back action (e.g., roll back 172) from a prior state corresponding to a moment in time (e.g., $t_N$) that is later than the moment in time (e.g., $t_K$) corresponding to the selected state. In other cases, the reversion action to achieve the selected system state is a roll forward action (e.g., roll forward 174) from a prior state corresponding to a moment in time (e.g., $t_1$) that is earlier than the moment in time (e.g., $t_K$) corresponding to the selected state. As earlier indicated the event of generation of a new system state (e.g., a stored system state) can be raised by virtue of passage of time through an interval, or by virtue of a write operation to an object that is considered part of the system state.

Figure 2A:
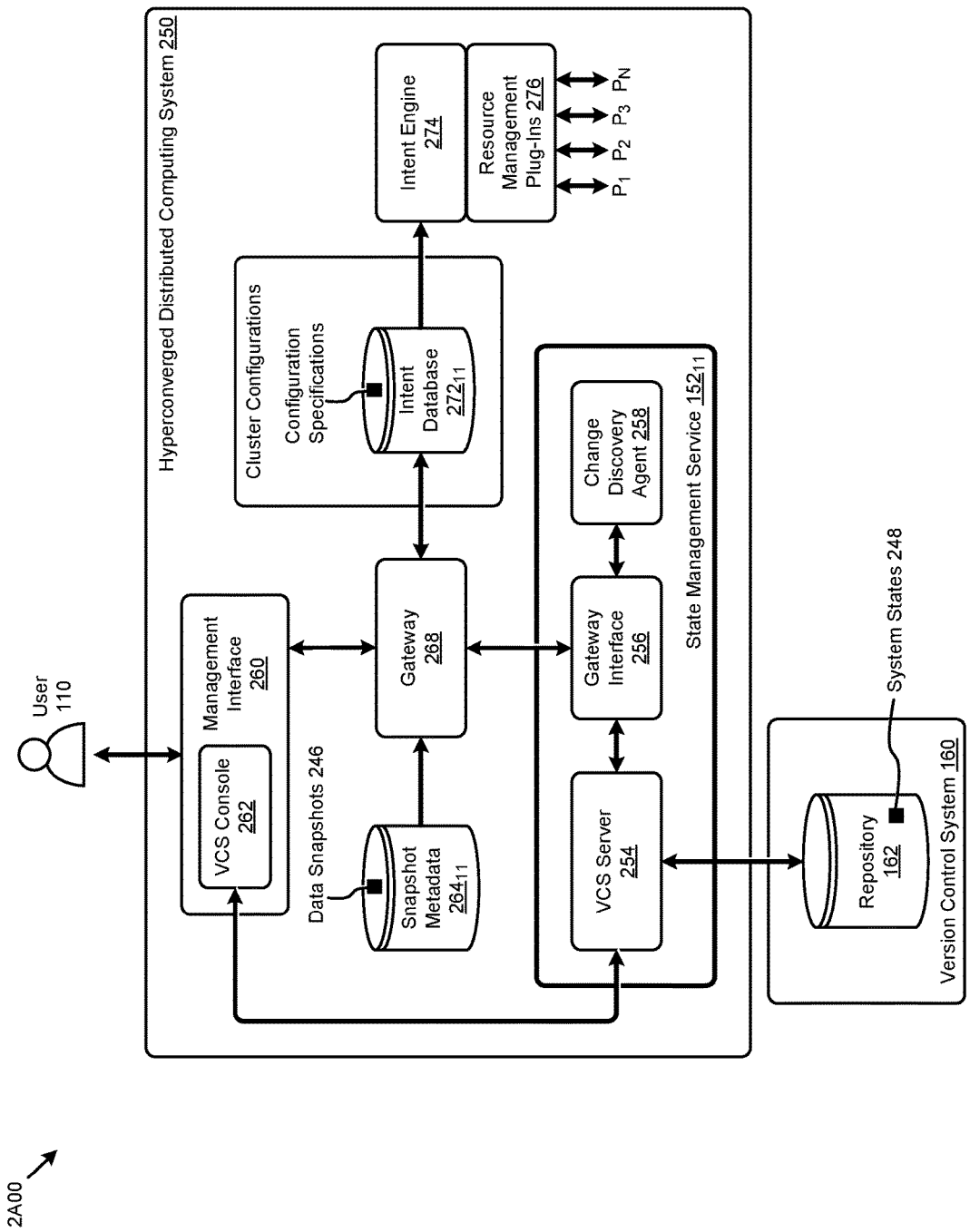
FIG. 2A presents a system flow as used to implement embodiments of the present disclosure, according to an embodiment.

One embodiment of a subsystem and corresponding data flows for implementing any of the herein disclosed techniques is shown and described as pertaining to FIG. 2A.

FIG. 2A presents a system flow 2A00 as used to implement embodiments of the present disclosure. As an option, one or more variations of system flow 2A00 or any aspect thereof may be implemented in the context of the architecture and functionality of the embodiments described herein. The system flow 2A00 or any aspect thereof may be implemented in any environment.

The embodiment shown in FIG. 2A is merely one implementation of a state management service and representative supporting components that facilitates management of the states of highly dynamic distributed computing systems (e.g., hyperconverged distributed computing system 250) according to the herein disclosed techniques. As can be observed, an instance of a state management service (e.g., state management service $152_{11}$) is implemented in the hyperconverged distributed computing system 250. Other instances of the state management service might be implemented in other nodes and/or clusters of the hyperconverged distributed computing system 250. According to the shown embodiment, state management service $152_{11}$ comprises a VCS server 254 to facilitate interactions with the version control system 160 and associated repository 162, which can often be external to the hyperconverged distributed computing system 250. The VCS server 254 can also expose a version control system console 262 in a management interface 260 to facilitate user interactions (e.g., by user 110) with the state management service $152_{11}$ and/or other components at the hyperconverged distributed computing system 250. As an example, user 110 might execute a specification change, publish a system state to the version control system 160, select a reversion state, and/or perform other operations at the management interface 260 and/or version control system console 262.

Further details pertaining to handling specification changes in a distributed computing system are described in U.S. Provisional Patent Application Ser. No. 62/425,484, filed on Nov. 22, 2016, which is hereby incorporated by reference in its entirety.

The state management service $152_{11}$ further comprises a gateway interface 256 to interact with an intent gateway 268 at the hyperconverged distributed computing system 250. The gateway interface 256, via the intent gateway 268, can facilitate access by the state management service $152_{11}$ to a set of snapshot metadata $264_{11}$ describing the data snapshots 246 and/or to an intent database $272_{11}$ for storing configuration specifications. A change discovery agent 258 operating at the state management service $152_{11}$ listens for changes to the data snapshots 246 and/or changes to the configuration specifications, and/or invokes operations for collection of various instances of the data snapshots 246 and/or the configuration specifications. An intent engine 274 coupled to a set of resource management plug-ins 276 are implemented in the hyperconverged distributed computing system 250 to deploy specified resource usage intent to the system. Specifically, intent engine 274 uses the resource management plug-ins 276 to generate a set of intent deployment commands based in part on the configuration specifications to issue to various subsystems at the hyperconverged distributed computing system 250 to carry out the resource usage intent.

In carrying out the resource usage intent, intent engine 274 takes in an intent specification, determines a set of objects that would be affected by establishment of the specified intent, determines specific actions to apply over the set of objects, and applies such actions to the objects in an order determined by a precedence.

Figure 3A:
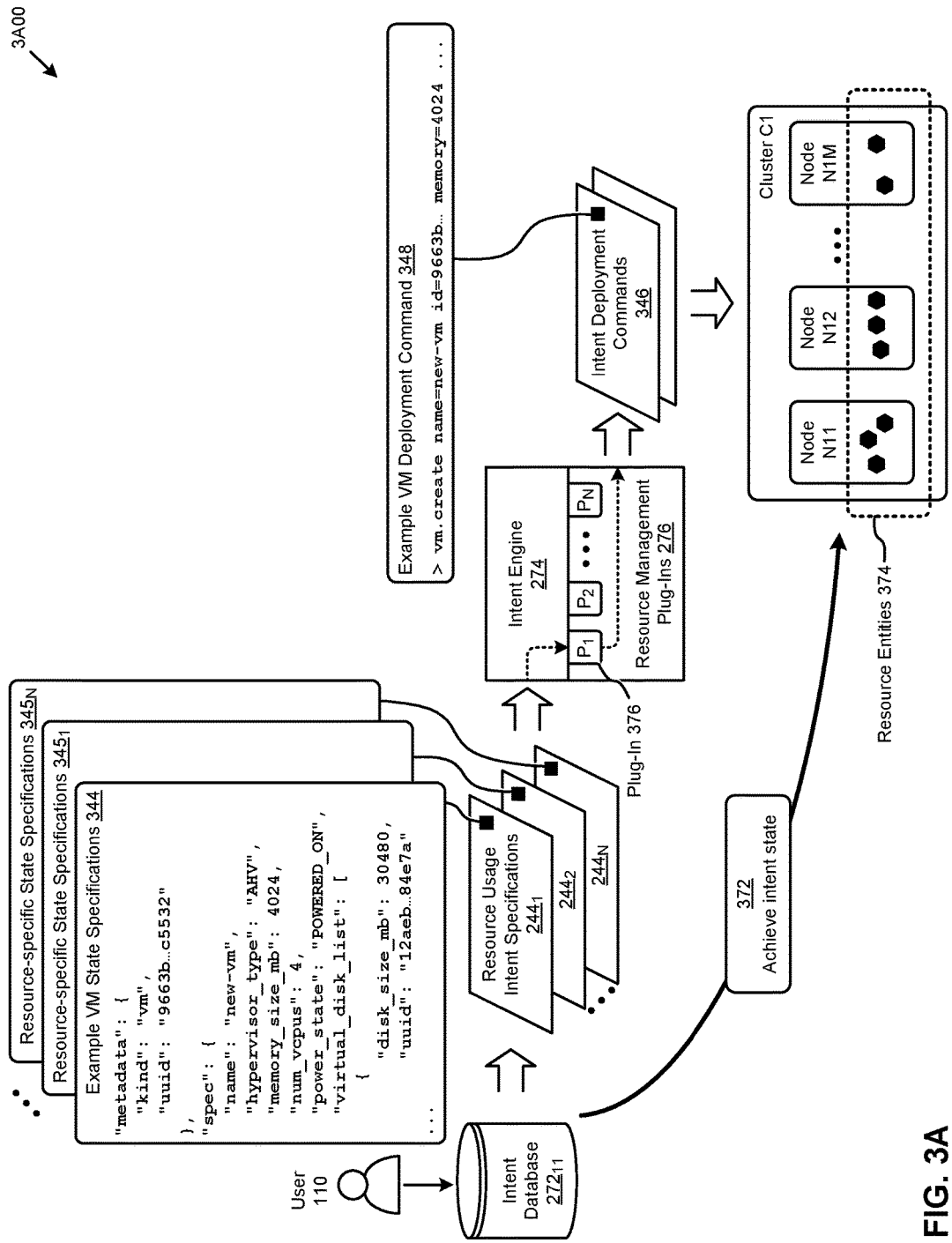
FIG. 3A illustrates a resource usage intent application technique as implemented in systems for managing the states of highly dynamic hyperconverged distributed computing systems, according to an embodiment.

Further details pertaining to applying resource usage intent specifications to a cluster of a distributed computing system are shown and described as pertaining to FIG. 3A. Also, further details regarding general approaches to applying user intent to a distributed computing system are described in U.S. Provisional Patent Application Ser. No. 62/434,456, filed on Dec. 15, 2016, which is hereby incorporated by reference in its entirety.

The components and data flows shown in FIG. 2A presents merely one partitioning and associated data manipulation approach. The specific example shown is purely exemplary, and other subsystems and/or partitioning are reasonable. Examples of protocols that can be implemented in such systems, subsystems, and/or partitionings according to the herein disclosed techniques are presented and discussed as pertains to FIG. 2B.

Figure 2B:
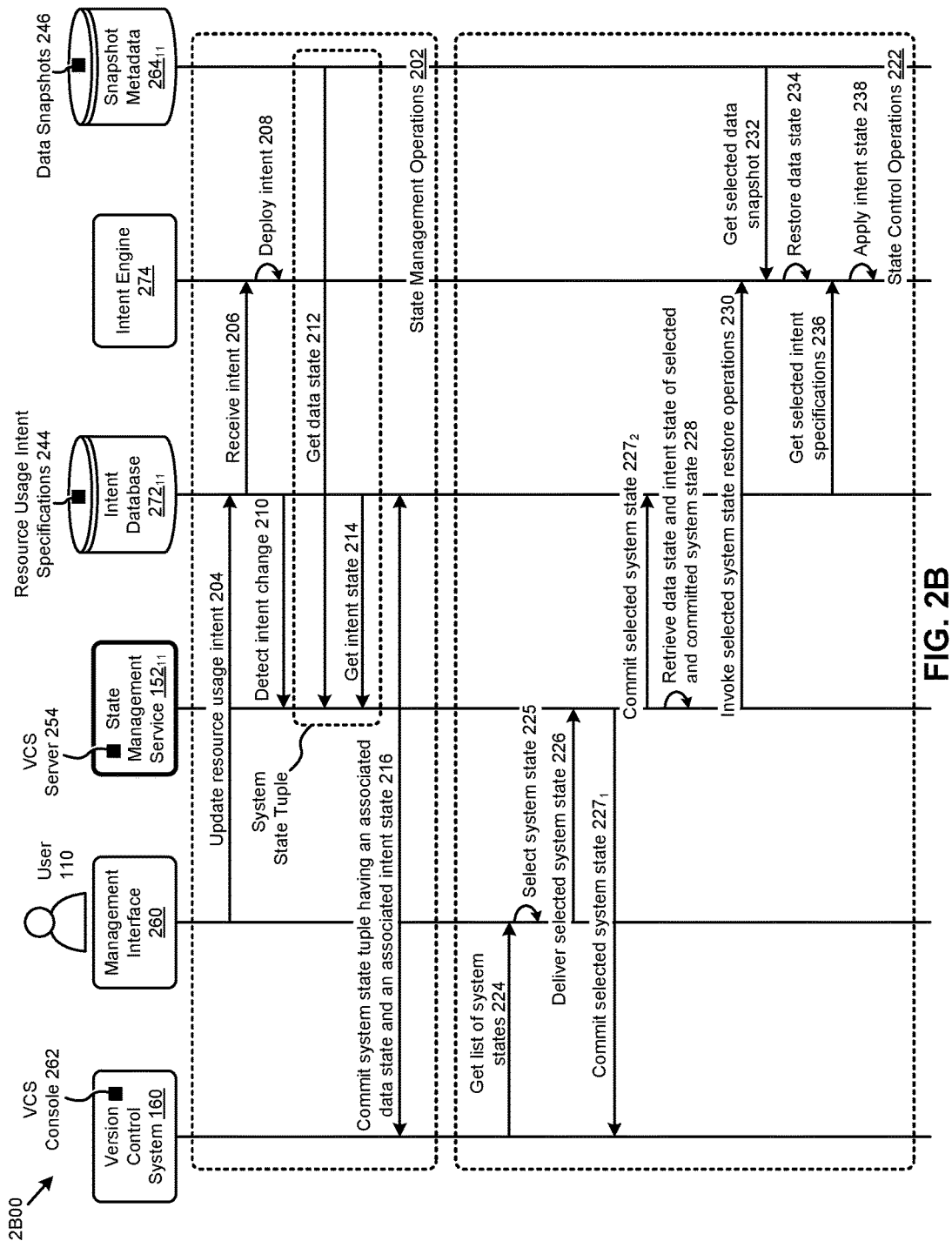
FIG. 2B presents an interaction diagram showing an inter-component protocol that facilitates management of the states of highly dynamic hyperconverged distributed computing systems, according to an embodiment.

FIG. 2B presents an interaction diagram 2B00 showing an inter-component protocol that facilitates management of the states of highly dynamic hyperconverged distributed computing systems. As an option, one or more variations of interaction diagram 2B00 or any aspect thereof may be implemented in the context of the architecture and functionality of the embodiments described herein. The interaction diagram 2B00 or any aspect thereof may be implemented in any environment.

Interaction diagram 2B00 presents various hyperconverged distributed computing system components earlier described that can exhibit a set of high order interactions (e.g., operations, messages, etc.) to facilitate implementations of the herein disclosed techniques. Specifically shown are a version control system 160, a management interface 260 (e.g., accessed by user 110), a state management service $152_{11}$, an intent database $272_{11}$ for storing various instances of resource usage intent specifications, an intent engine 274, and snapshot metadata $264_{11}$ that characterizes various instances of data snapshots 246. As can be observed, a first set of interactions can be described as a set of state management operations 202, and a second set of interactions can be described as a set of state control operations 222.

The state management operations 202 can commence by user 110 at management interface 260 updating certain resource usage intent specifications at intent database $272_{11}$ (message 204). Intent engine 274 can listen for, and receive, such changes (message 206) and, in turn, deploy them to the distributed computing system (operation 208). According to the herein disclosed techniques, state management service $152_{11}$ also detects the intent change (message 210). For example, a change discovery agent at the state management service $152_{11}$ might continually listen for such changes. Responsive to detecting the intent specification change, state management service $152_{11}$ will get the then-current data state of the system (message 212). As shown, the data state can be represented by metadata describing a then-current data snapshot. The state management service $152_{11}$ also gets the intent state from the intent database $272_{11}$ (message 214). As earlier described, the intent state can be represented by a then-current set of resource usage intent specifications which include the detected intent change. The state management service $152_{11}$ then commits to version control system 160 a system state associating the collected data state (e.g., then-current data snapshot) and intent state such as the then-current resource usage intent specifications (message 216).

The state control operations 222 can commence by user 110 at management interface 260 requesting a list of system states from version control system 160 (message 224). Information pertaining to the system state selected by user 110 (operation 225) is received by state management service $152_{11}$ (message 226). Responsive to receiving the selected system state, the state management service $152_{11}$ accesses the version control system 160 to (1) commit the selected system state to the version control system (message $227_1$), and (2) commit the selected system state to the intent database (message $227_2$). Next, the state management service retrieves the data state and intent state associated with the selected system state (operation 228). State management service $152_{11}$ forwards the retrieved data state and intent state information to intent engine 274 to invoke a restore of the selected system state (message 230). Intent engine 274 gets the selected data snapshot from snapshot metadata $264_{11}$ (message 232) to facilitate restoring the data state of the selected system state (operation 234). Intent engine 274 further gets the selected intent specifications from intent database $272_{11}$ (message 236) to facilitate restoring the intent state of the selected system state (operation 238).

As earlier mentioned, restoring the data state and applying the intent state associated with the selected system state serves to achieve the selected system state at the distributed computing system. Further details describing a technique for applying the intent state to a distributed computing environment are shown and described as pertaining to FIG. 3A.

FIG. 3A illustrates a resource usage intent application technique 3A00 as implemented in systems for managing the states of highly dynamic hyperconverged distributed computing systems. As an option, one or more variations of resource usage intent application technique 3A00 or any aspect thereof may be implemented in the context of the architecture and functionality of the embodiments described herein. The resource usage intent application technique 3A00 or any aspect thereof may be implemented in any environment.

The resource usage intent application technique 3A00 shown in FIG. 3A illustrates a technique for applying an intent state as described herein to a distributed computing system. Resource usage intent application technique 3A00 can be implemented to achieve a certain intent state at the system when managing or controlling the system states of highly dynamic distributed computing systems according to the herein disclosed techniques. Specifically, resource usage intent application technique 3A00 depicts representative data flows and structures to achieve a certain intent state at a cluster C1 of a distributed computing system (see operation 372). A set of resource usage intent specifications (e.g., resource usage intent specification $244_1$, resource usage intent specification $244_2$, resource usage intent specification $244_N$), are collected, which resource usage intent specifications describe a corresponding desired/intent state. In many cases, the resource usage intent specifications and any other data stored in the intent database $272_{11}$ are managed (e.g., created, updated, etc.) by one or more users (e.g., user 110). The resource usage intent specifications describe various specification attributes associated with an intended use of certain resources and/or entities (e.g., resource entities 374) in a given resource subsystem (e.g., cluster C1). As an example, any one or more of the resource usage intent specifications might comprise specifications such as the shown example VM state specifications 344 of FIG. 3A. The example VM state specifications 344 depicts merely one example of a data structure and set of key-value pairs that can be implemented to characterize resource usage intent specifications. The example VM state specifications 344 describe a VM (e.g., "kind": "vm") identified by a universally unique identifier (e.g., "uuid": "9663b . . . c5532") and having certain qualities, such as a memory size of 4024 MB (e.g., "memory_size_mb": 4024). The resource usage intent specifications comprise resource-specific state specifications (e.g., resource-specific state specifications $345_1$, resource-specific state specifications $345_N$, etc.) that correspond to respective resource-specific usage intent specifications (e.g., resource usage intent specifications $244_2$, resource usage intent specifications $244_N$).

According to the resource usage intent application technique 3A00, the resource usage intent specifications are received by intent engine 274 and directed to one or more of the resource management plug-ins 276 (e.g., $P_1$, $P_2$, . . . , $P_N$) for interpretation. For example, intent engine 274 might parse the resource usage intent specifications 244 so as to identify the example VM state specifications 344 and direct the example VM state specifications to a VM plug-in 376 (e.g., plug-in $P_1$) for processing. The resource management plug-ins 276 interpret the received specifications to generate a set of intent deployment commands 346 to be executed at various subsystems in cluster C1 to cause the cluster to reach the intended state. As a specific example, the VM plug-in 376 might generate the example VM deployment command 348 from the VM state specifications. The example VM deployment command 348 is formed with syntax and semantics that comply with an API of the receiving subsystem, and comprises parameters (e.g., id=9663b . . . , memory=4024, etc.) that derive from the VM state specifications. When the intent deployment commands 346 are executed at the cluster C1, the resulting set of resource entities 374 in the cluster will be configured to the achieve the desired intent state.

As earlier described, a given system state comprises an intent state and a data state, according to certain embodiments. An example technique and set of representative data structures for associating system states with intent states and data states are shown and described as pertaining to FIG. 3B.

Figure 3B:
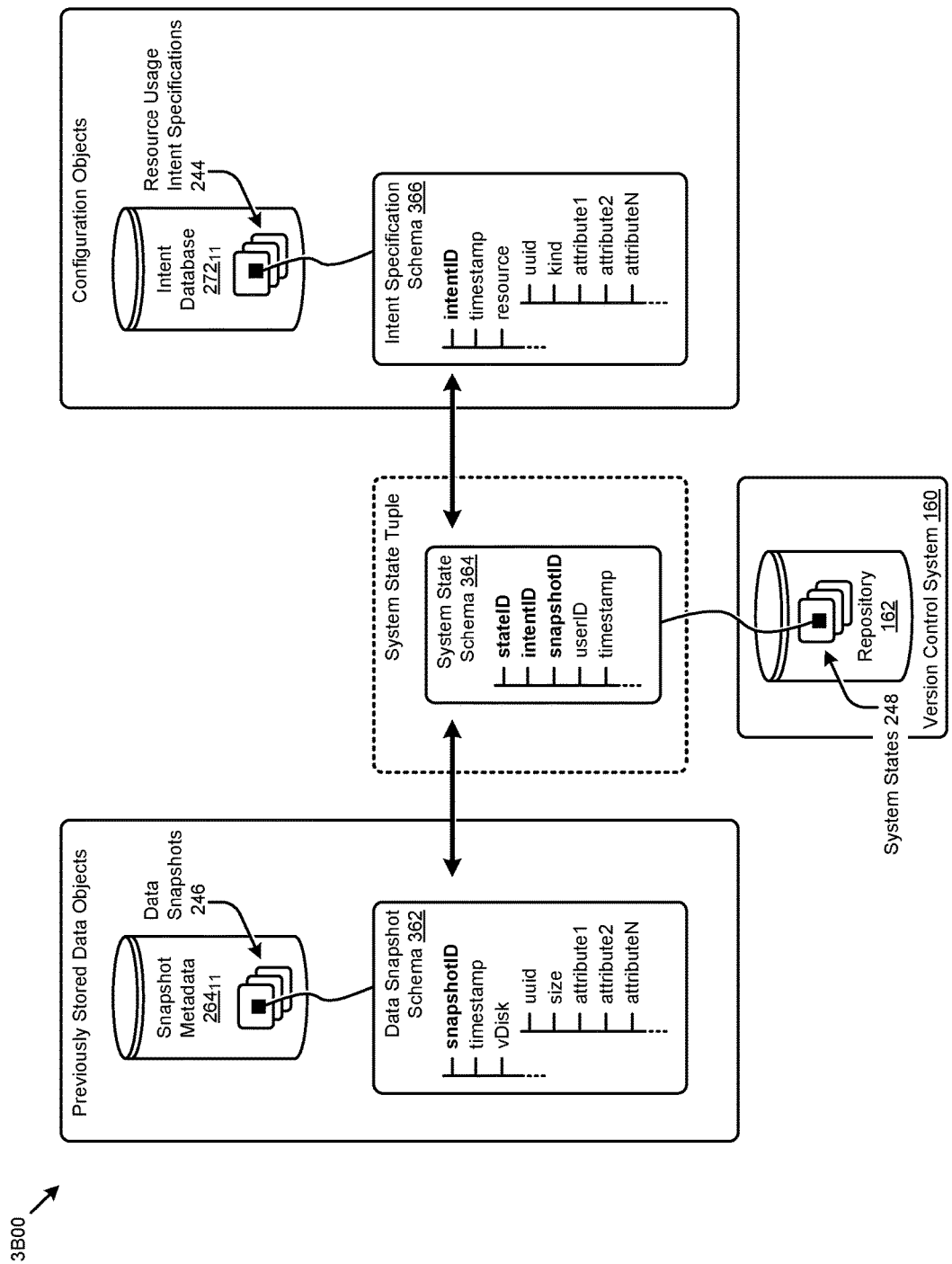
FIG. 3B depicts examples of data structures as used in systems for managing the states of highly dynamic hyperconverged distributed computing systems, according to an embodiment.

FIG. 3B depicts examples of data structures 3B00 as used in systems for managing the states of highly dynamic hyperconverged distributed computing systems. As an option, one or more variations of data structures 3B00 or any aspect thereof may be implemented in the context of the architecture and functionality of the embodiments described herein. The data structures 3B00 or any aspect thereof may be implemented in any environment.

FIG. 3B depicts example data storage schema that can be implemented to associate a given system state with a respective intent state and data state, according to the herein disclosed techniques. Specifically, in certain embodiments, managing and/or controlling states in a distributed computing system is facilitated by recording various instances of system states 248 in a repository 162 of a version control system 160. Each of the instances of system states 248 reference a respective instance of resource usage intent specifications 244 characterizing an intent state of the system, and a respective instance of data snapshots 246 characterizing a data state of the system.

As shown, the instances of the resource usage intent specifications 244 can be stored in the intent database $272_{11}$ according to an intent specification schema 366. For example, the resource usage intent specifications 244 can be organized and/or stored in a tabular structure (e.g., relational database table) having rows (e.g., records, tuples, etc.) corresponding to a certain intent state and columns corresponding to attributes (e.g., fields) associated with that particular intent state. For example, a row corresponding to a unique intent state identifier or "intentID" might have a set of columns (e.g., "timestamp", "resource", etc.) storing information representing the attributes associated with the intent state. As illustrated, each identified resource (e.g., entity) associated with a particular intent state can store a subset of attributes (e.g., "uuid", "kind", "attribute1", "attribute2", etc.) associated with that resource. In some cases, the resource attributes are stored in a separate child table that is keyed to the parent intent state table by the "intentID" key in a one-to-many relationship (e.g., one intent state to many resources). For example, referring to the example VM state specifications 344 in FIG. 3A, a VM child table might have a primary key associated with the "uuid" attribute and columns associated with other shown specification attributes (e.g., "kind", "name", "hypervisor_type", "memory_size_mb", "num_vcpus", "power_state", etc.).

Also, the instances of data snapshots 246 can be identified in snapshot metadata $264_{11}$ according to a data snapshot schema 362. For example, the snapshot metadata $264_{11}$ can be organized and/or stored in a tabular structure (e.g., relational database table) having rows (e.g., records, tuples, etc.) corresponding to a certain data snapshot and columns corresponding to attributes (e.g., fields) associated with that particular data snapshot. For example, a row corresponding to a unique data snapshot identifier or "snapshotID" might have a set of columns (e.g., "timestamp", "vDisk", etc.) storing information representing the attributes associated with the data snapshot. As illustrated, each identified virtual disk (e.g., "vDisk") associated with a particular data snapshot can store a subset of attributes (e.g., "uuid", "size", "attribute1", "attribute2", etc.) associated with that vDisk. In some cases, the vDisk attributes are stored in a separate child table that is keyed to the parent data snapshot table by the "snapshotID" key in a one-to-many relationship (e.g., one data snapshot to many vDisks).

To associate a given system state with a respective intent state and data state, a system state schema 364 can be used. The system state schema 364 facilitates associating a unique system state identifier (e.g., "stateID") with a unique intent state identifier (e.g., "intentID") and a unique data state identifier (e.g., "snapshotID"). Specifically, the system states 248 can be organized and/or stored in repository 162 in a tabular structure (e.g., relational database table) having rows (e.g., records, tuples, etc.) corresponding to a certain system state and columns corresponding to attributes (e.g., fields) associated with that particular system state. For example, a row corresponding to a unique system state identifier or "stateID" might have a set of columns (e.g., "intentID" and "snapshotID") referencing the intent state and data state, and another set of columns (e.g., "userID", "timestamp", etc.) storing information representing other attributes associated with the system state.

Figure 4A:
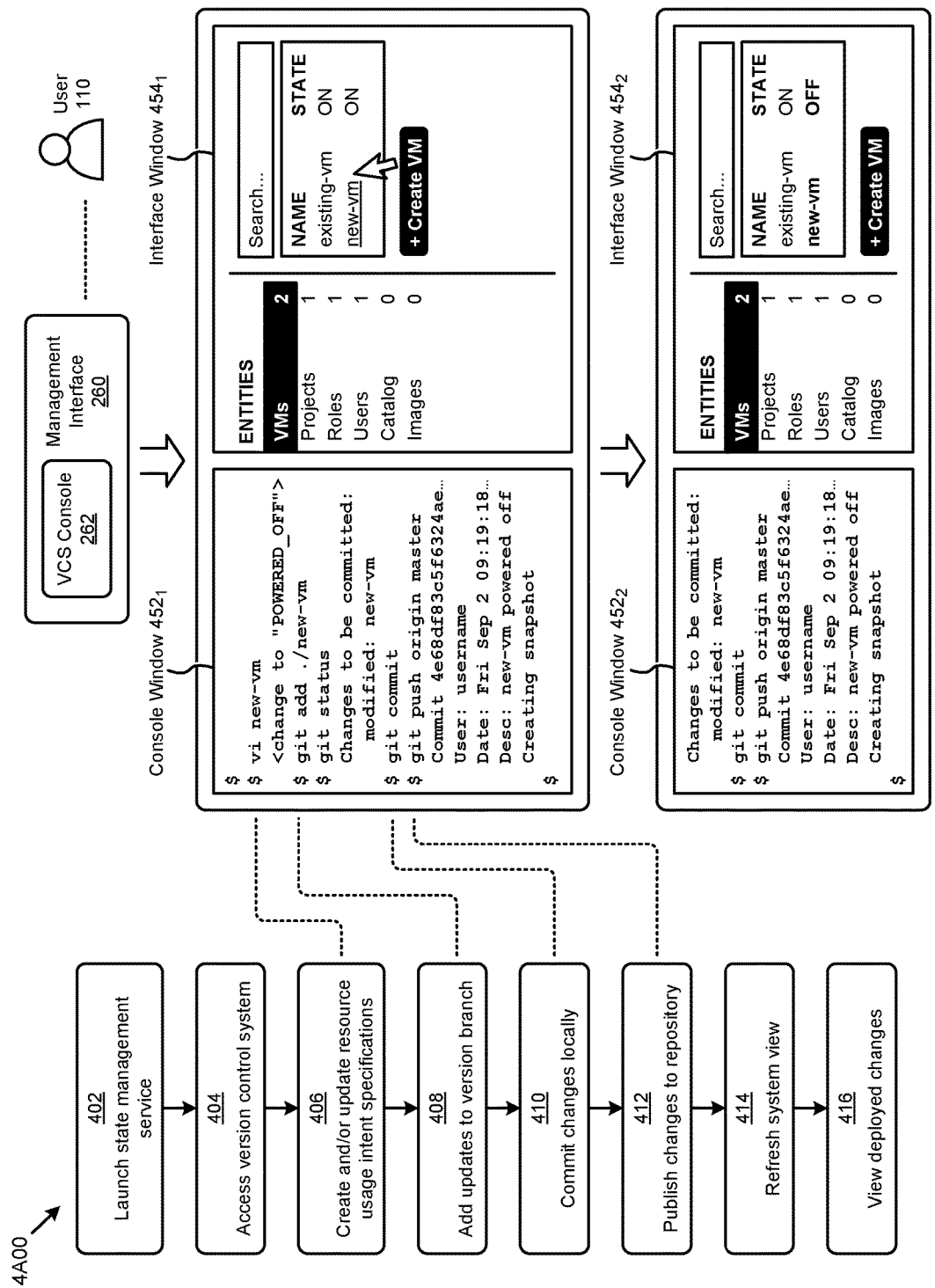
FIG. 4A presents a state management use model as implemented in systems for managing the states of highly dynamic hyperconverged distributed computing systems, according to an embodiment.
Figure 4B:
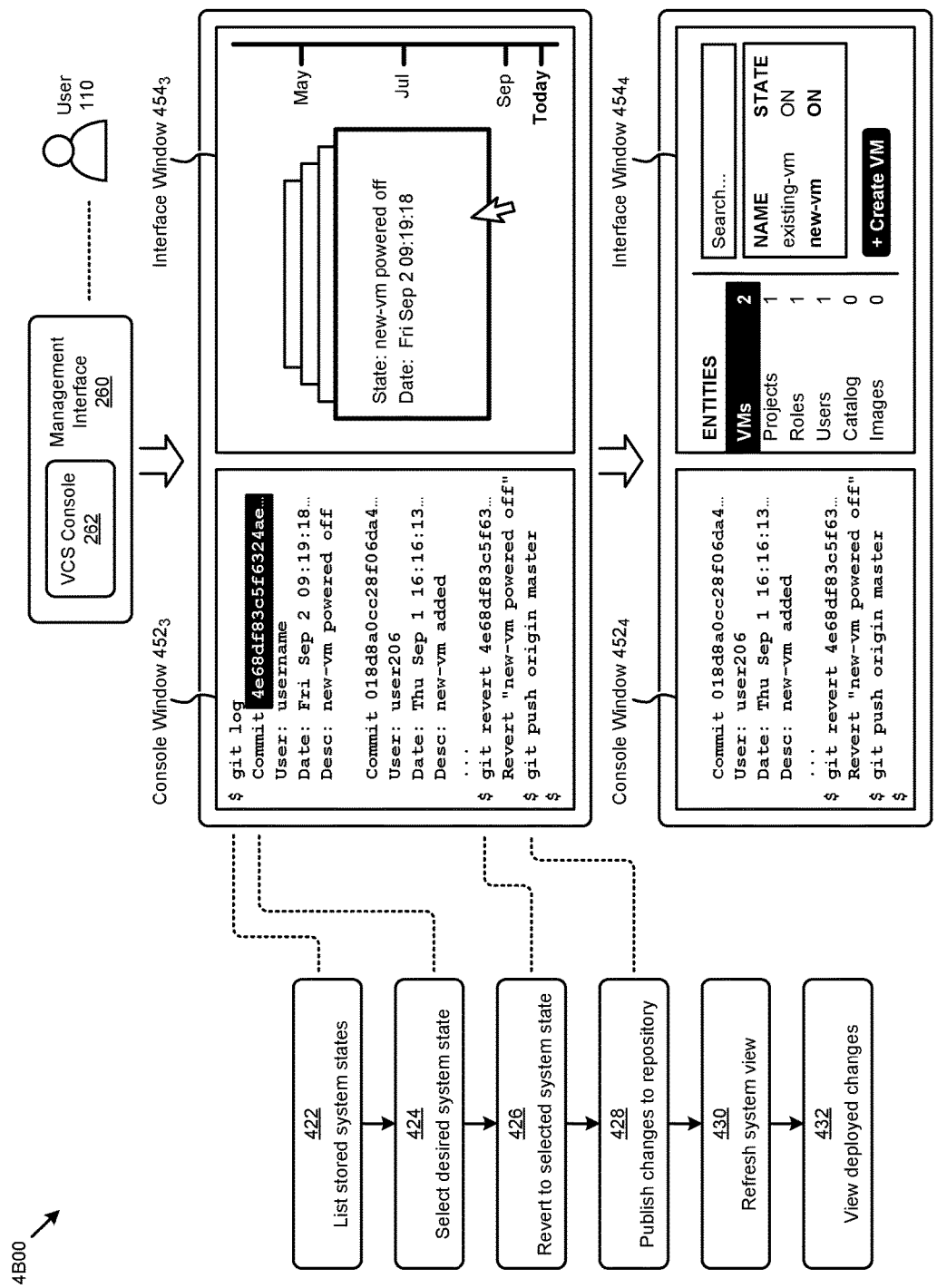
FIG. 4B presents a state selection use model as implemented in systems for managing the states of highly dynamic hyperconverged distributed computing systems, according to an embodiment.

The foregoing data structures can facilitate distributed computing system state management (e.g., tracking) and/or control (e.g., selection) as shown and described as pertaining to FIG. 4A and FIG. 4B, respectively.

FIG. 4A presents a state management use model 4A00 as implemented in systems for managing the states of highly dynamic hyperconverged distributed computing systems. As an option, one or more variations of state management use model 4A00 or any aspect thereof may be implemented in the context of the architecture and functionality of the embodiments described herein. The state management use model 4A00 or any aspect thereof may be implemented in any environment.

FIG. 4A presents one embodiment of certain steps and/or operations for interacting with systems for managing (e.g., tracking) the states of highly dynamic hyperconverged distributed computing systems, according to the herein disclosed techniques. Representative views presented by a management interface 260 and/or version control system console 262 are also presented. As shown, the state management use model can commence with a user (e.g., user 110) launching a state management service, such as state management service $152_{11}$ earlier described (step 402). In some embodiments, the state management service might be implemented as an application extension (e.g., plug-in, etc.) to a local or centralized access point application for managing the hyperconverged distributed computing system. User 110 then uses the state management service to access a version control system (step 404). For example, access to the version control system (VCS) such as Git might be established through a Git server implemented at the state management service. In some cases, a secure shell (SSH) protocol might be implemented to securely access a VCS that is external to the distributed computing system.

When the state management service is launched and connection to the VCS is established, a user interface such as depicted by interface window $454_1$ and console window $452_1$ might be presented. User 110 can use such presented interfaces to create and/or update resource usage intent specifications (step 406). For example, user 110 might invoke a "vi" editor in console window $452_1$ to change the "power_state" attribute of a VM named "new-vm" to have a "POWERED_OFF" state. As another example, user 110 might click a "new_vm" link in interface window $454_1$ to edit the VM attributes. When finished with intent specification changes, the updates are added to a local version branch (step 408). For example, user 110 might enter "git add ./new-vm" in console window $452_1$ to update the version branch. User 110 then commits the changes locally by, for example, entering "git commit" in the console window $452_1$ (step 410). In some cases, user 110 will be prompted to add a description of the committed change. The committed changes are published to the VCS repository to facilitate synchronization with other changes invoked by other sources (e.g., other users) associated with the distributed computing system (step 412). As an example, user 110 might enter "git push origin master" in console window $452_1$ to publish to the repository.

Responsive to publishing the updated intent specifications, the intent state changes are detected and applied to the system, according to the herein disclosed techniques. A refresh of the interface view (step 414) will display the results of the deployed intent changes (step 416). Specifically, a refresh might present a console window $452_2$ and interface window $454_2$, which shows the state of "new-vm" is now "OFF".

As earlier described, the publishing operation further comprises capturing the then-current data state of the system so as to include a reference to both the intent state and the data state in the system state (e.g., "version") published to the VCS. Capturing the then-current data state and other underlying operations invoked by higher order VCS commands can be implemented with scripts (e.g., "hooks") supported by the VCS API. The various instances of system states stored in the VCS repository can be accessed and controlled as shown and described as pertaining to FIG. 4B.

FIG. 4B presents a state selection use model 4B00 as implemented in systems for managing the states of highly dynamic hyperconverged distributed computing systems. As an option, one or more variations of state selection use model 4B00 or any aspect thereof may be implemented in the context of the architecture and functionality of the embodiments described herein. The state selection use model 4B00 or any aspect thereof may be implemented in any environment.

FIG. 4B presents one embodiment of certain steps and/or operations for interacting with systems for controlling (e.g., selecting) the state of highly dynamic hyperconverged distributed computing systems, according to the herein disclosed techniques. Representative views presented by a management interface 260 and/or version control system console 262 are also presented. Specifically, a user interface such as depicted by interface window $454_3$ and console window $452_3$ might be presented. User 110 can use the presented interfaces to list the system states stored in a VCS repository, such as a Git repository (step 422). For example, user 110 might enter a "git log" command in console window $452_3$ to list the stored system states. As shown, a list of system states identified by a "Commit" identifier is presented in response to the log command. Other attributes (e.g., "User", "Date", "Desc", etc.) associated with each stored system state is also presented. As another example, user 110 might browse the timeline of stored system states graphically presented in interface window $454_3$.

The system state desired for the distributed computing system is selected (step 424) and reversion to that state is invoked (step 426). For example, user 110 might copy at the console window $452_3$ the "Commit" identifier associated with the selected state and paste it into a "git revert" command. As another example, user 110 might merely click on the desired state from the stack of states presented in the interface window $454_3$. In the example of FIG. 4B, user 110 has selected a system state that indicates a desire to revert back to a state prior to powering off VM "new-vm".

User 110 then publishes the selected state to the VCS repository by, for example, entering a "git push origin master" in the console window $452_3$ (step 428). Responsive to publishing the selected system state, the intent state and data state associated with the selected system state applied and restored to the system, according to the herein disclosed techniques. A refresh of the interface view (step 430) will display the results of the deployed selected system state (step 432). Specifically, a refresh might present a console window $452_4$ and interface window $454_4$, which shows the state of "new-vm" is rolled back to an "ON" state.

Figure 5:
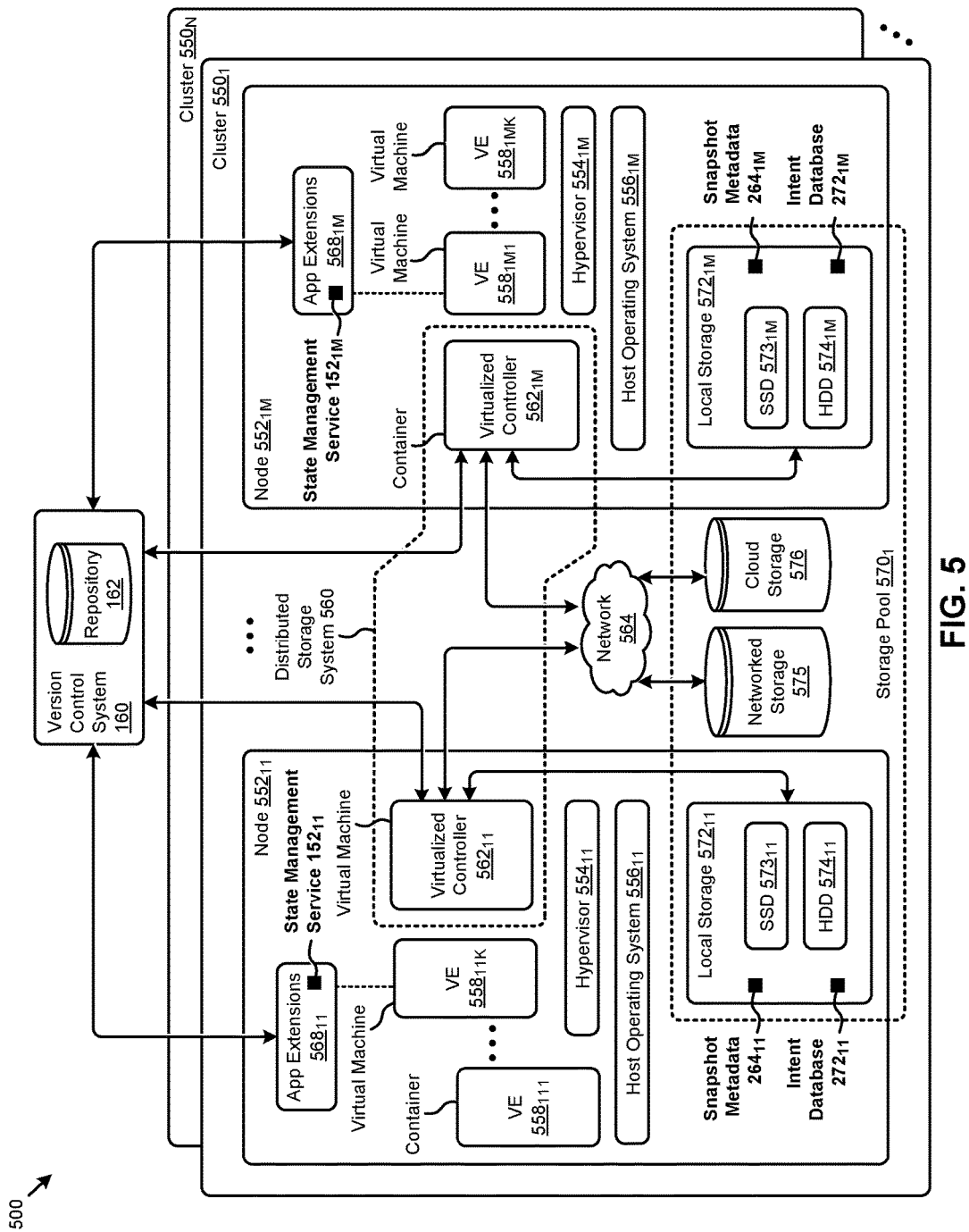
FIG. 5 depicts a distributed virtualization environment in which embodiments of the present disclosure can operate.

One embodiment of an environment for implementing any of the herein disclosed techniques is shown and described as pertaining to FIG. 5.

FIG. 5 depicts a distributed virtualization environment 500 in which embodiments of the present disclosure can operate.

The shown distributed virtualization environment depicts various components associated with one instance of a distributed virtualization system (e.g., hyperconverged distributed computing system) comprising a distributed storage system 560 that can be used to implement the herein disclosed techniques. Specifically, the distributed virtualization environment 500 comprises multiple clusters (e.g., cluster $550_1$, . . . , cluster $550_N$) comprising multiple nodes that have multiple tiers of storage in a storage pool. Representative nodes (e.g., node $552_{11}$, . . . , node $552_{1M}$) and storage pool $570_1$ associated with cluster $550_1$ are shown. Each node can be associated with one server, multiple servers, or portions of a server. The nodes can be associated (e.g., logically and/or physically) with the clusters. As shown, the multiple tiers of storage include storage that is accessible through a network 564, such as networked storage 575 (e.g., a storage area network or SAN, network attached storage or NAS, etc.), or such as cloud storage 576 (e.g., a remote repository, a remote cloud service provider's storage infrastructure, etc.). The multiple tiers of storage further include instances of local storage (e.g., local storage $572_{11}$, . . . , local storage $572_{1M}$). For example, the local storage can be within or directly attached to a server and/or appliance associated with the nodes. Such local storage can include solid state drives (SSD $573_1$, . . . , SSD $573_{1M}$), hard disk drives (HDD $574_1$, . . . , HDD $574_{1M}$), and/or other storage devices.

As shown, the nodes in distributed virtualization environment 500 can implement one or more user virtualized entities (e.g., VE $558_{111}$, . . . , VE $558_{11K}$, . . . , VE $558_{1M1}$, . . . , VE $558_{1MK}$) such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $556_{11}$, . . . , host operating system $556_{1M}$), while the VMs run multiple applications on various respective guest operating systems. Such flexibility can be facilitated at least in part by a hypervisor (e.g., hypervisor $554_{11}$, . . . , hypervisor $554_{1M}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $556_{11}$, . . . , host operating system $556_{1M}$) without, in most cases, a hypervisor layer. This lightweight implementation can facilitate efficient distribution of certain software components, such as applications or services (e.g., micro-services). As shown, distributed virtualization environment 500 can implement both a hypervisor-assisted virtualization environment and a container virtualization environment for various purposes.

Distributed virtualization environment 500 also comprises at least one instance of a virtualized controller to facilitate access to storage pool $570_1$ by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a hypervisor).

Multiple instances of such virtualized controllers can coordinate within a cluster to form the distributed storage system 560 which can, among other operations, manage the storage pool $570_1$. This architecture further facilitates efficient scaling of the distributed virtualization system. The foregoing virtualized controllers can be implemented in distributed virtualization environment 500 using various techniques. Specifically, an instance of a virtual machine at a given node can be used as a virtualized controller in a hypervisor-assisted virtualization environment to manage storage and I/O activities. In this case, for example, the virtualized entities at node $552_{11}$ can interface with a controller virtual machine (e.g., virtualized controller $562_{11}$) through hypervisor $554_{11}$ to access the storage pool $570_1$. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 560.

For example, a hypervisor at one node in the distributed storage system 560 might correspond to VMware ESXi software, and a hypervisor at another node in the distributed storage system 560 might correspond to Nutanix AHV software. As another virtualized controller implementation example, containers (e.g., Docker containers) can be used to implement a virtualized controller (e.g., virtualized controller $562_{1M}$) in an operating system virtualization environment at a given node. In this case, for example, the virtualized entities at node $552_{1M}$ can access the storage pool $570_1$ by interfacing with a controller container (e.g., virtualized controller $562_{1M}$) through hypervisor $554_{1M}$ and/or the kernel of host operating system $556_{1M}$.

In certain embodiments, one or more instances of a state management service can be implemented in the distributed virtualization environment 500 to facilitate the herein disclosed techniques. In certain embodiments, the state management service can be implemented as an application extension (e.g., app extension) managed by a virtualized entity (e.g., VM, container, etc.). More specifically, the state management service might be implemented as a containerized application extension managed by a virtualized container service machine. As shown in FIG. 5, state management service $152_{11}$ is implemented in a set of app extensions $568_{11}$ managed by VE $558_{11K}$ (e.g., virtualized container service machine) in node $552_{11}$, and state management service $152_{1M}$ is implemented in a set of app extensions $568_{1M}$ managed by VE $558_{1M1}$ (e.g., virtualized container service machine) in node $552_{1M}$. In other embodiments, instances of the state management service are implemented in respective instances of the virtualized controller. As can be observed, a version control system 160 and/or its repository 162 external to the clusters can be accessed by instances of the virtualized controller and/or directly by instances of the state management service. Such instances of the virtualized controller, the state management service, the app extensions, and/or the virtualized service machines can be implemented in any node in any cluster. Actions taken by one or more instances of the state management service and/or virtualized controller can apply to a node (or between nodes), and/or to a cluster (or between clusters), and/or between any resources or subsystems accessible by the virtualized controller or their agents (e.g., state management service). As further shown, the metadata and datastores associated with the herein disclosed techniques can be stored in various storage facilities in the storage pool $570_1$. As an example, snapshot metadata $264_{11}$ and intent database $272_{11}$ might be stored at local storage $572_{11}$, and snapshot metadata $264_{1M}$ and intent database $272_{1M}$ might be stored at local storage $572_{1M}$.

Additional Embodiments of the Disclosure

Additional Practical Application Examples

Figure 6A:
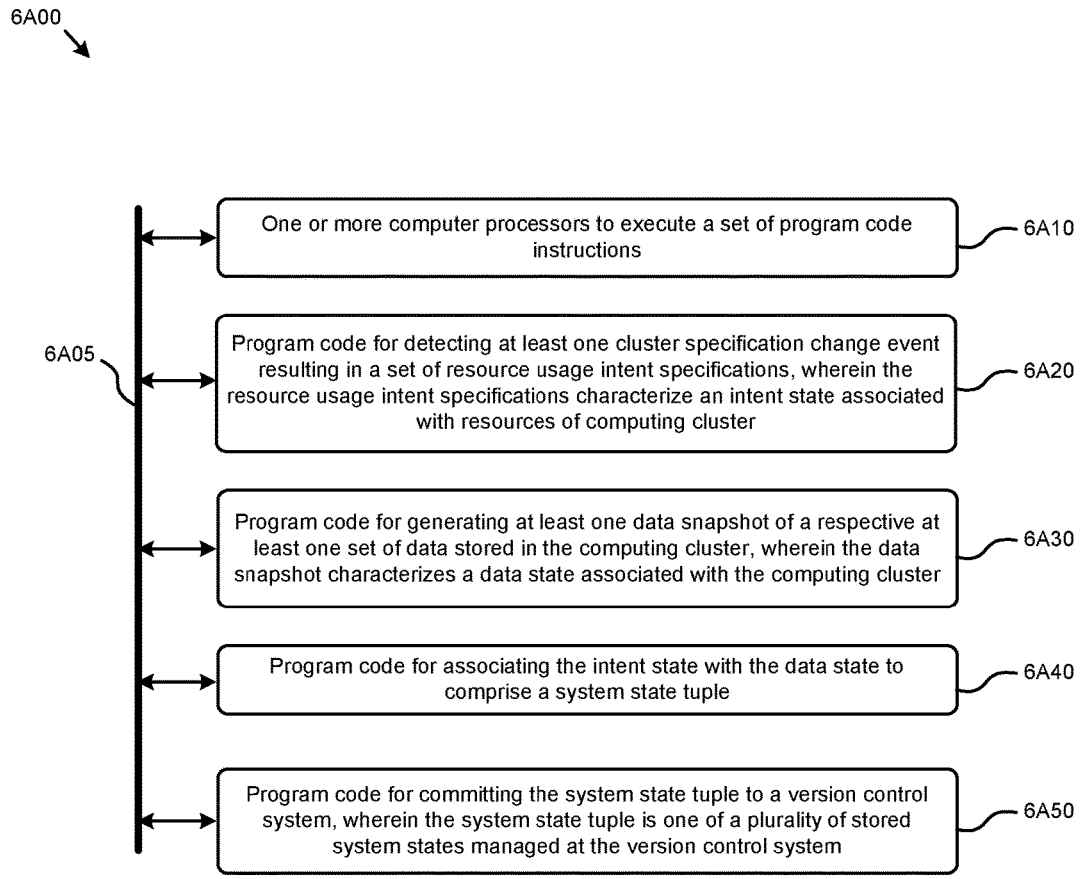
FIG. 6A and FIG. 6B depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. This and other embodiments present particular arrangements of elements that, individually and/or as combined, serve to form improved technological processes that address efficiently tracking the state of the resources in a highly dynamic multi-user distributed computing system. The partitioning of system 6A00 is merely illustrative and other partitions are possible. As an option, the system 6A00 may be implemented in the context of the architecture and functionality of the embodiments described herein. Of course, however, the system 6A00 or any operation therein may be carried out in any desired environment. The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with other operations over communication path 6A05. The modules of the system can, individually or in combination, perform method operations within system 6A00. Any operations performed within system 6A00 may be performed in any order unless as may be specified in the claims. The shown embodiment implements a portion of a computer system, presented as system 6A00, comprising a computer processor to execute a set of program code instructions (module 6A10) and modules for accessing memory to hold program code instructions to perform: detecting at least one cluster specification change event resulting in a set of resource usage intent specifications, wherein the resource usage intent specifications characterize an intent state associated with resources of computing cluster (module 6A20); generating at least one data snapshot of a respective at least one set of data stored in the computing cluster, wherein the data snapshot characterizes a data state associated with the computing cluster (module 6A30); associating the intent state with the data state to comprise a system state tuple (module 6A40); and committing the system state tuple to a version control system, wherein the system state tuple is one of a plurality of stored system states managed at the version control system (module 6A50).

Variations of the foregoing may include more or fewer of the shown modules. Certain variations may perform more or fewer (or different) steps, and/or certain variations may use data elements in more, or in fewer (or different) operations.

Figure 6B:
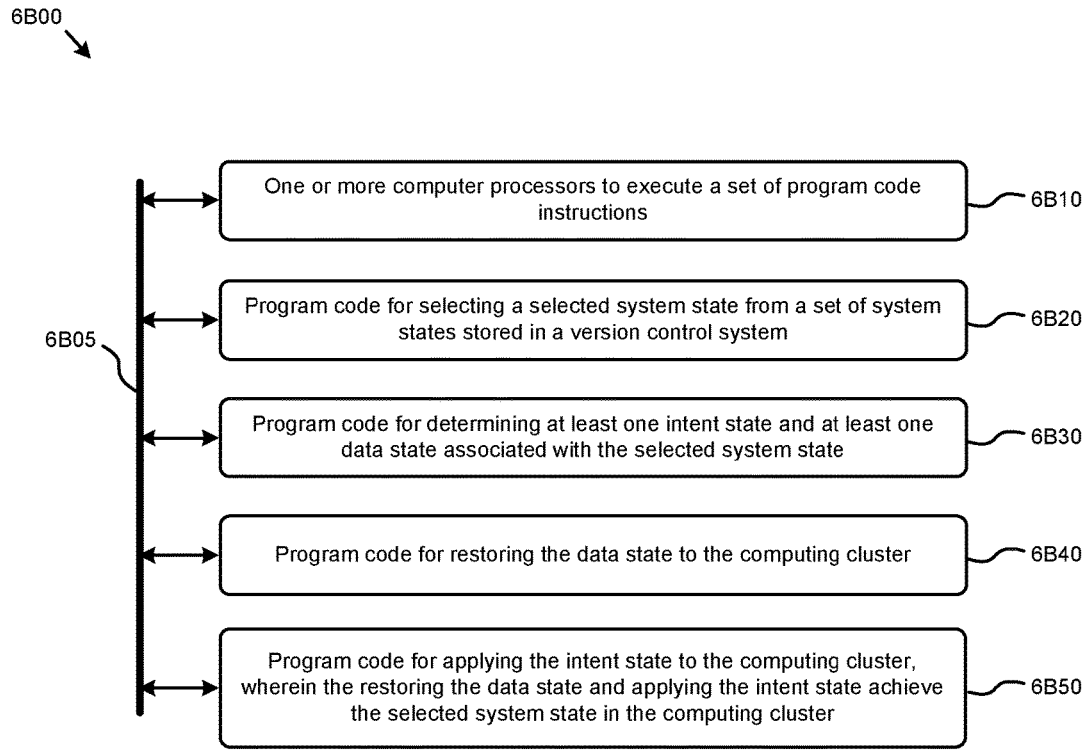

FIG. 6B depicts a system 6B00 as an arrangement of computing modules that are interconnected so as to operate cooperatively to implement certain of the herein-disclosed embodiments. This and other embodiments present particular arrangements of elements that, individually and/or as combined, serve to form improved technological processes that address efficiently restoring the state of the resources in a highly dynamic multi-user distributed computing system. The partitioning of system 6B00 is merely illustrative and other partitions are possible. As an option, the system 6B00 may be implemented in the context of the architecture and functionality of the embodiments described herein. Of course, however, the system 6B00 or any operation therein may be carried out in any desired environment. The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with other operations over communication path 6B05. The modules of the system can, individually or in combination, perform method operations within system 6B00. Any operations performed within system 6B00 may be performed in any order unless as may be specified in the claims. The shown embodiment implements a portion of a computer system, presented as system 6B00, comprising a computer processor to execute a set of program code instructions (module 6B10) and modules for accessing memory to hold program code instructions to perform: selecting a selected system state from a set of system states stored in a version control system (module 6B20); determining at least one intent state and at least one data state associated with the selected system state (module 6B30); restoring the data state to the computing cluster (module 6B40); and applying the intent state to the computing cluster, wherein the restoring the data state and applying the intent state achieve the selected system state in the computing cluster (module 6B50).

Variations of the foregoing may include more or fewer of the shown modules. Certain variations may perform more or fewer (or different) steps, and/or certain variations may use data elements in more, or in fewer (or different) operations.

System Architecture Overview

Additional System Architecture Examples

Figure 7A:
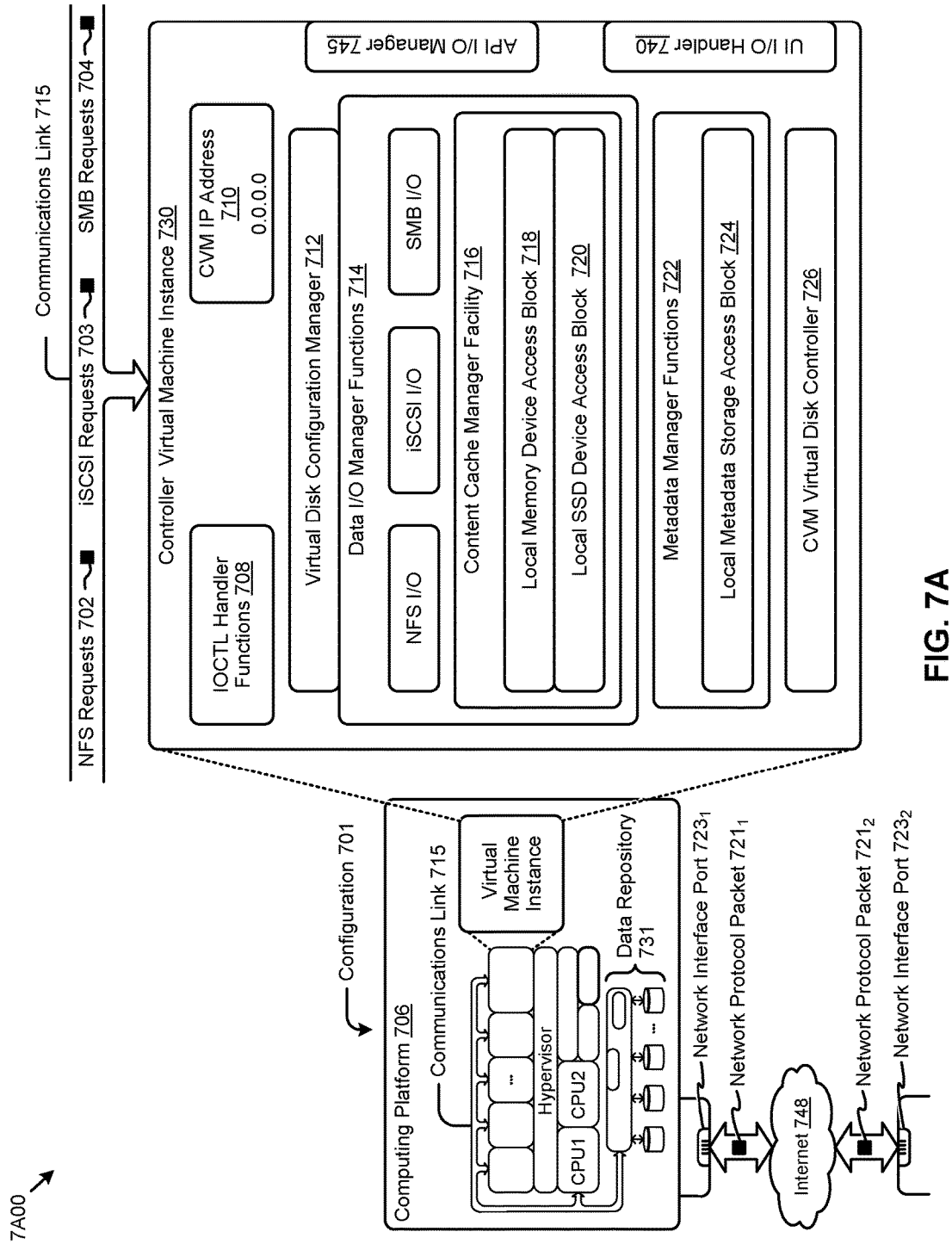
FIG. 7A and FIG. 7B depict virtualized controller architectures comprising collections of interconnected components suitable for implementing embodiments of the present disclosure and/or for use in the herein-described environments.

FIG. 7A depicts a virtualized controller as implemented by the shown virtual machine architecture 7A00. The heretofore-disclosed embodiments including variations of any virtualized controllers can be implemented in distributed systems where a plurality of networked-connected devices communicate and coordinate actions using inter-component messaging. Distributed systems are systems of interconnected components that are designed for or dedicated to storage operations as well as being designed for, or dedicated to, computing and/or networking operations. Interconnected components in a distributed system can operate cooperatively so as to serve a particular objective, such as to provide high-performance computing, high-performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates efficient use of compute and storage resources by and between the components of the distributed system. Adding a hyperconverged unit to a hyperconverged system expands the system in multiple dimensions. As an example, adding a hyperconverged unit to a hyperconverged system can expand in the dimension of storage capacity while concurrently expanding in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as containers. In some systems and/or environments, hypervisor-assisted virtualization techniques and operating system virtualization techniques are combined.

As shown, the virtual machine architecture 7A00 comprises a collection of interconnected components suitable for implementing embodiments of the present disclosure and/or for use in the herein-described environments. Moreover, the shown virtual machine architecture 7A00 includes a virtual machine instance in a configuration 701 that is further described as pertaining to the controller virtual machine instance 730. A controller virtual machine instance receives block I/O (input/output or IO) storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output (I/O or IO) can be handled by one or more IO control handler functions (e.g., IOCTL functions 708) that interface to other functions such as data IO manager functions 714 and/or metadata manager functions 722. As shown, the data IO manager functions can include communication with a virtual disk configuration manager 712 and/or can include direct or indirect communication with any of various block IO functions (e.g., NFS IO, iSCSI IO, SMB IO, etc.).

In addition to block IO functions, the configuration 701 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through the shown API IO manager 745.

The communications link 715 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 730 includes a content cache manager facility 716 that accesses storage locations, possibly including local dynamic random access memory (DRAM) (e.g., through the local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 731, which in turn can be formatted into any one or more storage areas, and which can comprise parameterized storage accessible by a key (e.g., a filename, a table name, a block address, an offset address, etc.). An external data repository 731 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 724. The external data repository 731 can be configured using a CVM virtual disk controller 726, which can in turn manage any number or any configuration of virtual disks.

Execution of the sequences of instructions to practice certain embodiments of the disclosure are performed by a one or more instances of a software instruction processor, or a processing element such as a data processor, or such as a central processing unit (e.g., CPU1, CPU2). According to certain embodiments of the disclosure, two or more instances of a configuration 701 can be coupled by a communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $723_1$ and network interface port $723_2$). The configuration 701 can be addressed through one or more network interface ports using an IP address. Any operational element within computing platform 706 can perform sending and receiving operations using any of a range of network protocols, possibly including network protocols that send and receive packets (e.g., network protocol packet $721_1$ and network protocol packet $721_2$).

The computing platform 706 may transmit and receive messages that can be composed of configuration data, and/or any other forms of data and/or instructions organized into a data structure (e.g., communications packets). In some cases, the data structure includes program code instructions (e.g., application code) communicated through the Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or results of executing program code can be delivered to a particular user via a download (e.g., a download from the computing platform 706 over the Internet 748 to an access device).

The configuration 701 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A cluster is often embodied as a collection of computing nodes that can communicate between each other through a local area network (e.g., LAN or VLAN) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provision of power to the other units. In some cases, a unit in a rack is dedicated to environmental conditioning functions such as filtering and movement of air through the rack, and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to implement algorithms that facilitate operational and/or performance characteristics pertaining to managing the states of highly dynamic hyperconverged distributed computing systems. In some embodiments, a module may include one or more state machines and/or combinational logic used to implement or facilitate the operational and/or performance characteristics pertaining to managing the states of highly dynamic hyperconverged distributed computing systems.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of managing the states of highly dynamic hyperconverged distributed computing systems). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to managing the states of highly dynamic hyperconverged distributed computing systems, and/or for improving the way data is manipulated when performing computerized operations pertaining to committing a set of resource usage intent specifications and an associated stored data snapshot at certain moments in time to a version control system to facilitate state tracking and/or control (e.g., reversion) in hyperconverged distributed computing systems.

Further details regarding general approaches to managing data repositories are described in U.S. Pat. No. 8,601,473 titled, "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled, "METHOD AND SYSTEM FOR IMPLEMENTING MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 7B:
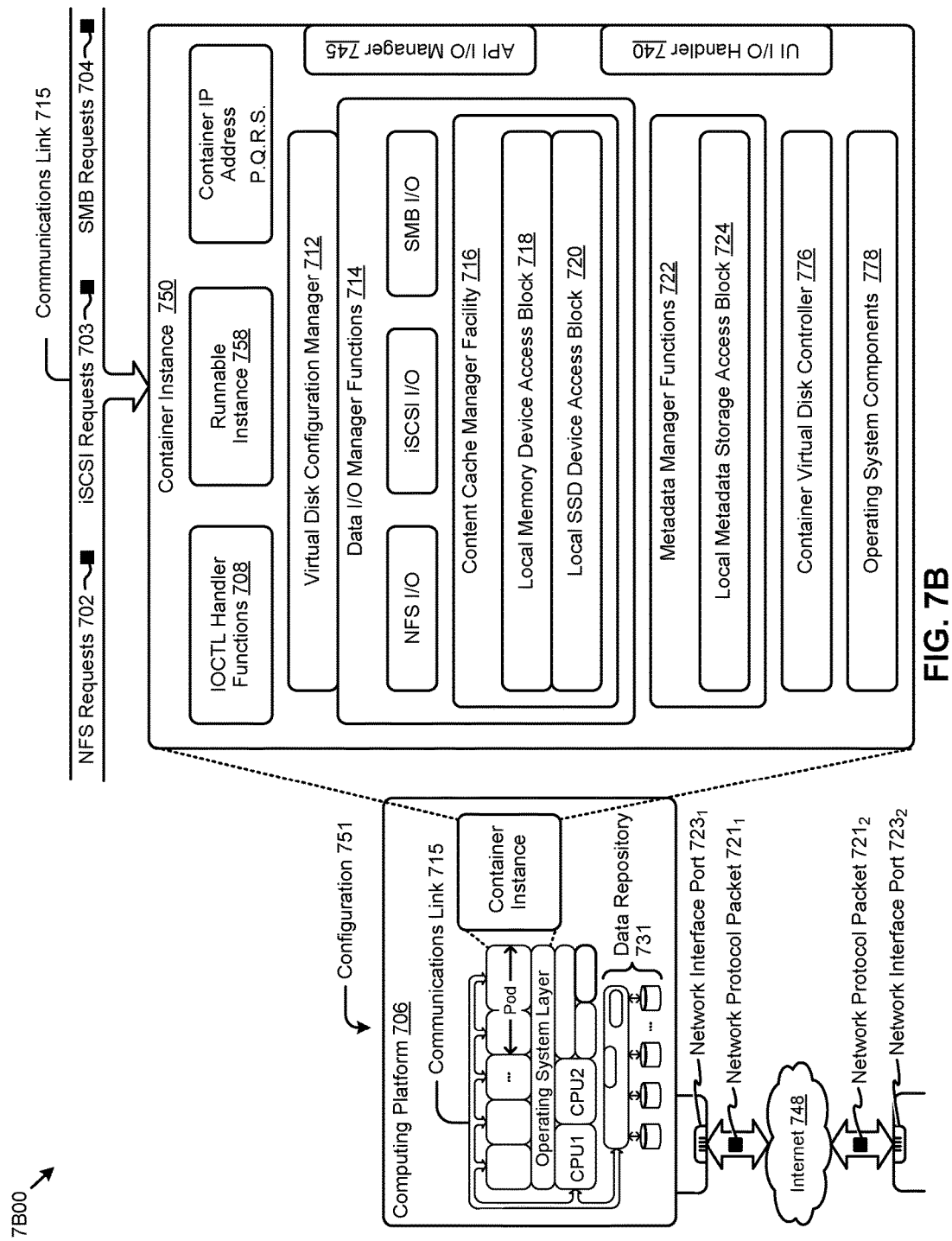

FIG. 7B depicts a virtualized controller implemented by a containerized architecture 7B00. The containerized architecture comprises a collection of interconnected components suitable for implementing embodiments of the present disclosure and/or for use in the herein-described environments. Moreover, the shown containerized architecture 7B00 includes a container instance in a configuration 751 that is further described as pertaining to the container instance 750. The configuration 751 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 750). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls-a", etc.). The container might optionally include operating system components 778, however such a separate set of operating system components need not be provided. As an alternative, a container can include a runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method, comprising:
receiving a resource usage specification for a computing system, the resource usage specification describing deployment of one or more virtual machines on one or more nodes of the computer system, the resource usage specification describing the deployment of the one or more virtual machines using one or more attributes and corresponding values;
generating a snapshot of data stored in the computing system, the snapshot of data representing one or more virtual disks corresponding to respective virtual machines of the one or more virtual machines described by the resource usage specification;
associating the resource usage specification with the snapshot; and
committing an association of the resource usage specification with the snapshot to a version control system, wherein the association is one of a plurality of associations managed at the version control system.

2. The method of claim 1, wherein the resource usage specification includes one or changes from a current system state, and further comprising applying the resource usage specification over resources of the computing system.

3. The method of claim 1, wherein the snapshot is generated prior to applying one or more changes associated with the resource usage specification the resource usage specification to the computing system.

4. The method of claim 1, wherein the snapshot and the resource usage specification are storage on a first one or more databases, and the associations are storage on a second database.

5. The method of claim 1, wherein the one or more attributes describe at least one entity in the computing system.

6. The method of claim 1, further comprising quiescing at least a portion of the computing system prior to generating the snapshot.

7. The method of claim 1, wherein a unique identifier is associated with at least one of the resource usage specification or the snapshot.

8. The method of claim 1, wherein the associations at the version control system are managed by at least one user through at least one of, a management interface or a version control system console.

9. The method of claim 1, wherein a repository of the version control system stores one or more data records associated with at least one of, the association of the resource usage specification with the snapshot, the snapshot, snapshot metadata, or the resource usage specification.

10. The method of claim 1, wherein the version control system is at least one of, a source code control system, a source code repository, or GitHub.

11. A non-transitory computer readable medium having stored thereon a sequence of instructions which, when executed by a processor causes performs a set of acts comprising:
   receiving a resource usage specification for a computing system, the resource usage specification describing deployment of one or more virtual machines on one or more nodes of the computer system, the resource usage specification describing the deployment of the one or more virtual machines using one or more attributes and corresponding values;
   generating a snapshot of data stored in the computing system, the snapshot of data representing one or more virtual disks corresponding to respective virtual machines of the one or more virtual machines described by the resource usage specification;
   associating the resource usage specification with the snapshot; and
   committing an association of the resource usage specification with the snapshot to a version control system, wherein the association is one of a plurality of associations managed at the version control system.

12. The computer readable medium of claim 11, wherein the resource usage specification includes one or changes from a current system state, and the set of acts further comprise applying the resource usage specification over resources of the computing system.

13. The computer readable medium of claim 12, wherein the snapshot is generated prior to applying one or more changes associated with the resource usage specification the resource usage specification to the computing system.

14. The computer readable medium of claim 11, wherein the snapshot and the resource usage specification are storage on a first one or more databases, and the associations are storage on a second database.

15. The computer readable medium of claim 11, wherein the one or more attributes describe at least one entity in the computing system.

16. The computer readable medium of claim 11, the set of acts further comprising quiescing at least a portion of the computing system prior to generating the snapshot.

17. The computer readable medium of claim 11, wherein a unique identifier is associated with at least one of the resource usage specification or the snapshot.

18. The computer readable medium of claim 11, wherein the associations at the version control system are managed by at least one user through at least one of, a management interface or a version control system console.

19. A system comprising:
   a storage medium having stored thereon a sequence of instructions; and
   a processor that executes the sequence of instructions to perform a set of acts comprising,
      receiving a resource usage specification for a computing system, the resource usage specification describing deployment of one or more virtual machines on one or more nodes of the computer system, the resource usage specification describing the deployment of the one or more virtual machines using one or more attributes and corresponding values;
      generating a snapshot of data stored in the computing system, the snapshot of data representing one or more virtual disks corresponding to respective virtual machines of the one or more virtual machines described by the resource usage specification;
      associating the resource usage specification with the snapshot; and
      committing an association of the resource usage specification with the snapshot to a version control system, wherein the association is one of a plurality of associations managed at the version control system.

20. The system of claim 19, wherein the associations at the version control system are managed by at least one user through at least one of, a management interface or a version control system console.

* * * * *